US005676072A

United States Patent [19]
Williames

[11] Patent Number: 5,676,072
[45] Date of Patent: Oct. 14, 1997

[54] APPARATUS FOR AUTOMATICALLY PLANTING SEEDLINGS TAKEN FROM A HARD SEEDLING TRAY

[75] Inventor: Geoffrey Alan Williames, Warragul, Australia

[73] Assignee: Williames Hi-Tech International PTY Ltd., Victoria, Australia

[21] Appl. No.: 382,029

[22] PCT Filed: Aug. 10, 1993

[86] PCT No.: PCT/AU93/00408

§ 371 Date: Mar. 6, 1995

§ 102(e) Date: Mar. 6, 1995

[87] PCT Pub. No.: WO94/03040

PCT Pub. Date: Feb. 17, 1994

[30] Foreign Application Priority Data

Aug. 10, 1992 [AU] Australia ................... PL4040
Dec. 2, 1992 [AU] Australia ................... PL6139

[51] Int. Cl.⁶ ........................... A01C 11/00; A01C 11/02
[52] U.S. Cl. ..................... 111/105; 47/1.01; 47/901; 414/404
[58] Field of Search ................. 47/1.01, 901; 111/101, 111/104, 105, 106, 200, 112, 115; 414/403, 404, 416, 417, 502, 518

[56] References Cited

U.S. PATENT DOCUMENTS

| | | |
|---|---|---|
| 3,524,419 | 8/1970 | Middleton et al. . |
| 3,712,252 | 1/1973 | Huang . |
| 3,923,332 | 12/1975 | Shirouzu . |
| 4,132,337 | 1/1979 | Masuda et al. . |
| 4,307,827 | 12/1981 | Turunen . |
| 4,341,333 | 7/1982 | Boa et al. . |
| 4,408,549 | 10/1983 | Qvarnstrom . |
| 4,443,151 | 4/1984 | Armstrong et al. . |
| 4,597,343 | 7/1986 | Nambu . |
| 4,616,578 | 10/1986 | Talbott . |
| 4,788,920 | 12/1988 | Shaw ................... 111/105 |
| 4,869,637 | 9/1989 | deGroot ................ 111/105 X |
| 4,893,571 | 1/1990 | Häkli et al. ............... 111/105 |
| 4,932,338 | 6/1990 | Watanabe et al. ........ 111/105 |
| 5,121,701 | 6/1992 | Reed et al. . |
| 5,209,170 | 5/1993 | Kobayashi .............. 111/105 |
| 5,365,693 | 11/1994 | Van Wingerden et al. .... 111/105 X |
| 5,445,089 | 8/1995 | Houng et al. ............. 111/105 |

FOREIGN PATENT DOCUMENTS

| | | |
|---|---|---|
| 138039 | 10/1947 | Australia . |
| 1108478 | 9/1981 | Canada . |
| 2101462 | 1/1983 | United Kingdom . |
| 2166634 | 5/1986 | United Kingdom . |

Primary Examiner—Terry Lee Melius
Assistant Examiner—Robert Pezzuto
Attorney, Agent, or Firm—Learman & McCulloch

[57] ABSTRACT

A field seedling planting machine for transplanting seedlings automatically from a tray in which they have been grown in a plurality of individual cells, and planting such seedlings in a prepared ground planting position in the field, the machine having a support for supporting trays for downward movement to an indexing mechanism and an eject mechanism for ejecting the seedlings and the attached roots mass plugs from the cells of the tray. A horizontal plant retainer conveyor receives the seedlings and plugs ejected from the trays and transports them sequentially to a transfer mechanism to a planting mechanism and in doing so reorients the seedlings so that they and the plugs are planted in a vertical position. As the seedlings are transferred a sensor detects the absence of foliage of a mature seedling and effects an adjustment of the conveyor speed to avoid irregular gaps between the planted seedlings.

29 Claims, 19 Drawing Sheets

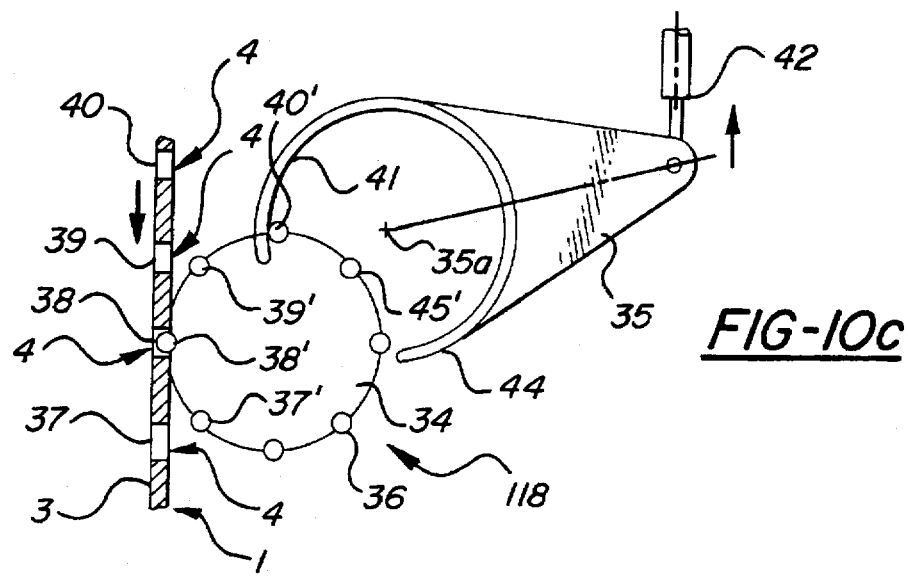
FIG-10c
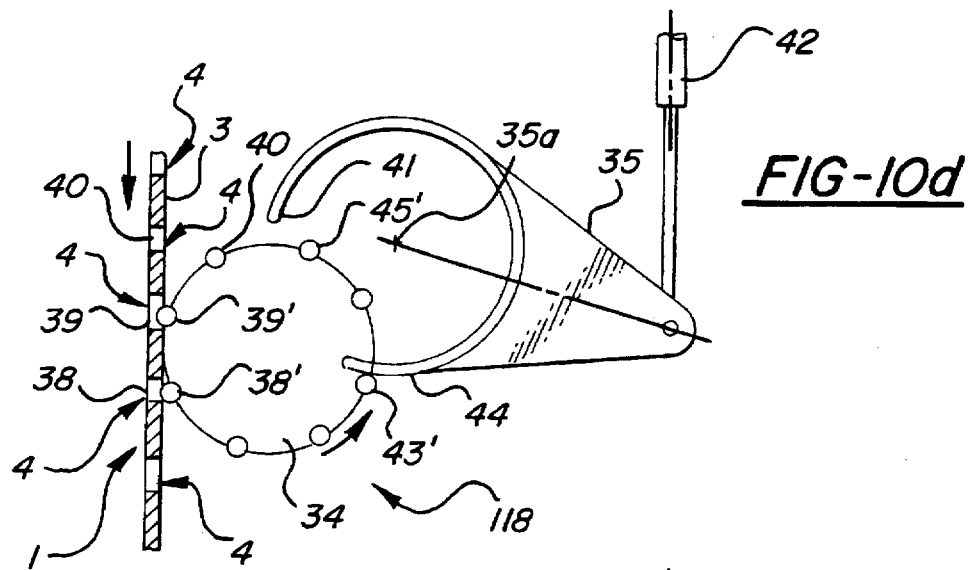
FIG-10d
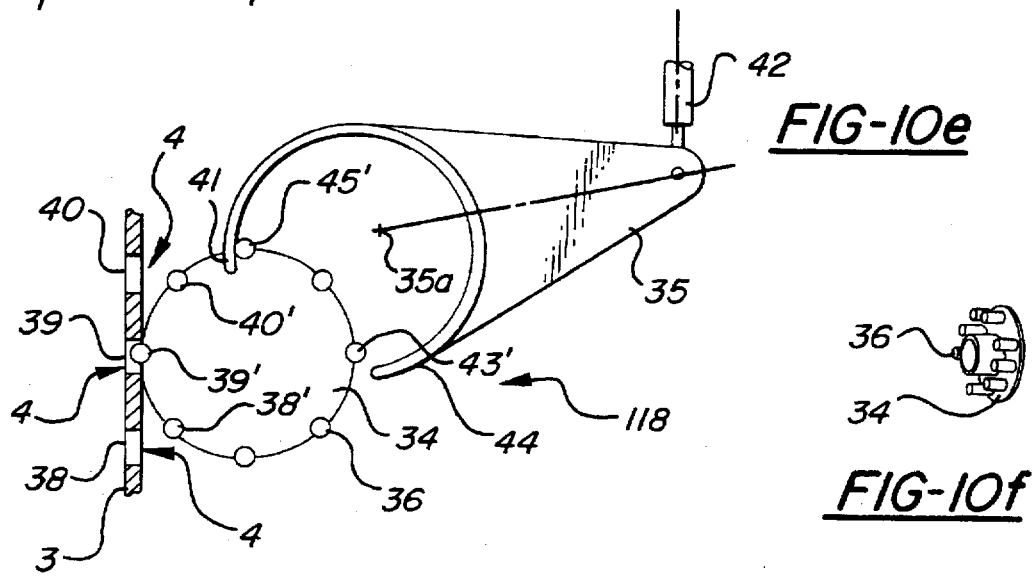
FIG-10e
FIG-10f

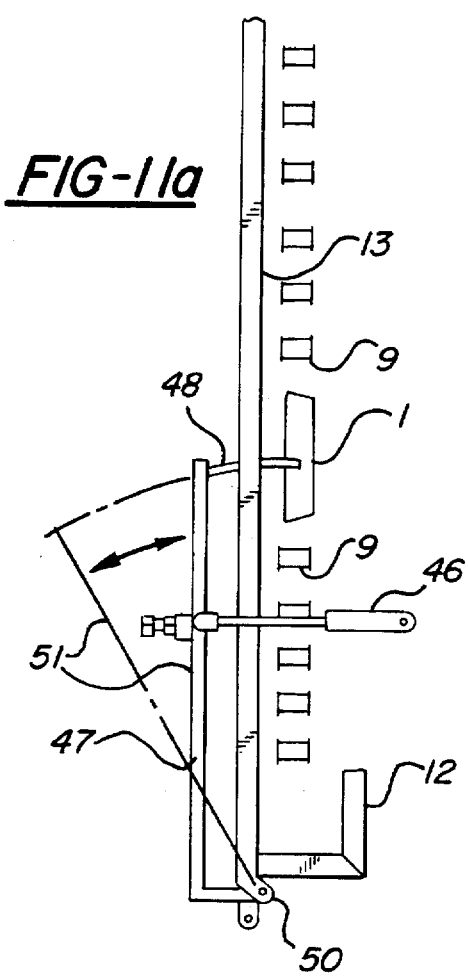
FIG-11a
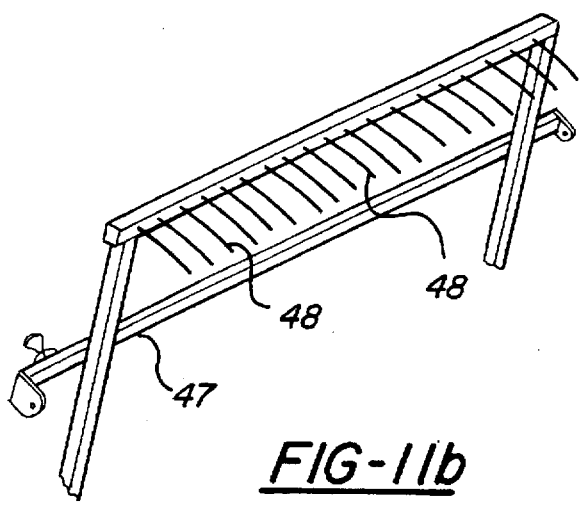
FIG-11b
FIG-11c
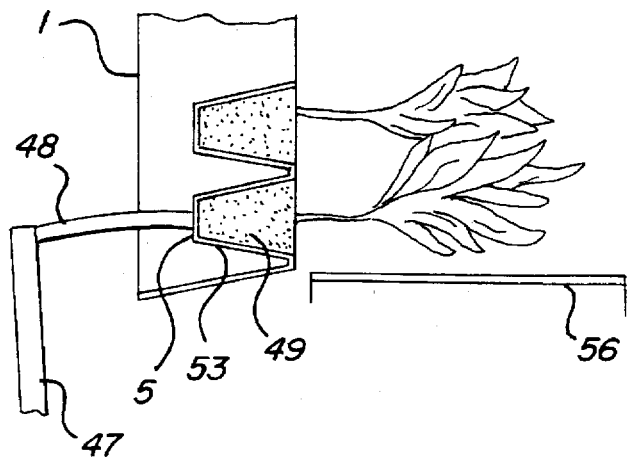
FIG-11d

APPARATUS FOR AUTOMATICALLY PLANTING SEEDLINGS TAKEN FROM A HARD SEEDLING TRAY

The present invention relates to improved machinery for handling plants or seedlings in a prepared ground planting position, preferably from a nursery growing container wherein plants are located in individual cells, the cells being located in spaced rows. Conveniently, the machinery is adapted to transfer and plant seedlings or plants from such containers with minimum or no manual intervention required.

Machinery of this general type is shown in Australian Patent No. 593066 where seedlings are transplanted from a cell chain in which they have been initially propagated and grown. In many nursery operations, however, seedlings are grown in rigid flat trays and it is also desired to provide a mechanism for transplanting seedlings from such trays to a prepared ground planting position. The provision of such machinery, however, is faced with a number of practical problems. Firstly, it is desirable to achieve fast transplanting speeds. Secondly, propagation of seedlings is not always 100% successful and inevitably a number of cells in a propagating tray will not hold a seedling or at least a viable seedling for transplanting. It is of course desirable to avoid spaces in ground planting positions caused by missing seedlings in the tray which then have to be planted manually. Thirdly, it is desirable to avoid any discontinuities in planting that might arise by the fact that indexing trays is necessarily not a fully continuous process. Fourthly, it is desirable to avoid or minimize transplanting errors that could arise by growth of seedlings flowing over into adjacent cell regions of a propagating tray. Finally it is desirable to keep the width of transplanting machines as low as possible and it is therefore desirable to load trays in a vertical manner generally in the planting direction which, however, necessitates reorienting the seedlings in some manner so that they are not transverse to the planting direction of the machine.

According to a first aspect, of the present invention there is provided a field seedling planting machine movable in a planting direction for transplanting seedlings propagated in seedling trays in a predetermined array of cells in said trays, said machine including eject means for ejecting said seedlings from the cells in a said tray either one by one or in groups so as to dispose said seedlings in seedling holding means of conveying means for delivering said seedlings sequentially to a prepared ground planting position, said planting machine being characterized by said conveyor means comprising a first conveyor means including said seedling holding means driven by first drive means so as to move said first conveyor means whereby said seedlings are sequentially delivered to an intermediate transfer region, a second conveyor means being disposed to receive said seedlings from said first conveyor means at said intermediate transfer region and to deliver said seedling to the prepared ground planting position, second drive means for driving said second conveyor means, sensor means located adjacent said first conveyor means at or preceding said transfer region arranged to determine if a seedling is held in each said seedling holding means, and control means linked with said sensor means and the first drive means to drive said first conveyor means in response to information received from said sensor means independently of said second drive means whereby seedlings are carried substantially equally spaced by said second conveyor means regardless of spacing of said seedlings on said first conveyor means. By such an arrangement it is possible to maintain substantially uniform spacing of plants in the ground even though certain cells in a tray being transplanted may not contain a seedling suitable for transplanting.

In accordance with a second aspect of this invention, a machine is provided that is movable in a planting direction for transplanting seedlings propagated in a predetermined array of cells in seedling trays, said machine including eject means for ejecting said seedlings from the cells in a said tray either one by one or in groups so as to dispose said seedlings in predetermined seedling holding means of a first conveyor means while said first conveyor means is stopped, first drive means for moving said first conveyor means so as to move said first conveyor means to an intermediate seedling transfer region, a second conveyor means being disposed to receive said seedlings from said first conveyor means at said intermediate transfer region and to deliver said seedlings to a prepared ground planting position, second drive means for moving said second conveyor means, at least one seedling retaining position arranged at said intermediate transfer region, the or each said retaining position being adapted to deliver a said seedling to said second conveyor means, the or each said seedling retaining position being arranged to hold a said seedling by increasing the speed of said first conveyor means prior to stopping said first conveyor means prior to stopping said first conveyor means when it is desired to eject one or more further seedlings from a said tray into the holding means of said first conveyor means, said seedling or seedlings in the or each said retaining position being delivered to said second conveyor means so as to maintain substantially equal spacing of seedlings carried by said second conveyor means regardless of the stopping of said first conveyor means. By such an arrangment it is possible to achieve substantially continuous and uniform seedling planting in the ground even though the first conveyor needs to be stopped each time a seedling or a group of seedlings is ejected from the tray to be conveyed by the first conveyor means.

According to a third aspect, the present invention provides a machine movable in a planting direction for planting seedlings, said machine including means means for receiving a tray of seedlings with the seedlings in said tray being disposed at an angle to the planting direction of said machine, and handling means for removing said seedlings from said tray and conveying said seedlings to a prepared ground planting position, said handling means comprising a pair of endless belt conveyors arranged with a belt run of each said endless belt conveyor means located adjacent one another, said belt runs being disposed to successively receive and hold root mass plugs of said seedlings therebetween while moving said seedlings from an inlet end to a discharge end of said belt runs, said belt runs further angularly reorienting said seedlings during movement from said inlet end to said discharge end. By this arrangement it is possible to conveniently reorientate the seedlings thereby allowing the trays to be loaded in any direction, conveniently parallel to the planting direction.

In accordance with a still further aspect, the present invention provides a machine for ejecting seedlings propagated in seedling trays in a predetermined array of cells in said trays, support means for holding a said seedling tray in a vertical configuration with axes of said cells disposed substantially horizontal, indexing means comprising a plurality of evenly spaced formations in opposed vertical walls of the seedling tray, said formations being engagable by toothed actuation means to positively index said tray to accurately align successive cell rows of the tray with eject means, said eject means being provided to eject seedling root plugs from their respective said cell and introduce said root plugs to holding means of conveyor means. This arrangement permits positive accurate indexing of trays so that they can be readily aligned with eject means for the seedlings so that further handling is not adversely affected by poor ejection processes.

In accordance with a still further aspect, the present invention provides a machine for ejecting seedlings propagated in seedling trays in a predetermined array of cells in said trays and to place said ejected seedlings on conveyor means in said by side configuration, support means for holding a said seedling tray in a vertical configuration with axes of said cells disposed substantially horizontally, eject means for moving seedlings from a said tray to said conveyor means, said conveyor means comprising at least one conveyor belt with a plurality of spaced upright partition means disposed transversely relative to said belt defining root plug receiving zones, each root plug receiving zone having an upwardly positioned stop means adapted to at least partially span the space between adjacent said partition means whereby a seedling root plug located in a said root plug receiving zone is prevented from moving upwardly out of said root plug receiving zone at least in the region of said eject means, and lift means is provided to bodily lift said seedling tray upwardly relative to the conveyor means after each operation of the eject means. By this arrangement problems of growth of seedlings between adjacent cells is substantially solved ensuring smooth ejection processing and subsequent handling.

The present invention also comprises separately or in combination, any one or more of the features disclosed and discussed in the following description.

In a preferred arrangement, the field planting machine can be attached readily to a tool bar which in turn is attached to a tractor or pulling device. Multiple field planting machines can be secured to these tool bars, the only limiting factor being the width of the tool bar.

The field planting machine has been designed to use a solid or fixed array nursery flat tray. This tray may be fed into a roller frame and indexed one row at a time down this frame. As it is indexed down one row at a time a plant eject frame operated pneumatically via pneumatic cylinders ejects one complete row of plants from the tray into a plant receptacle means. After ejection the eject frame immediately retracts and the tray is indexed down one row ready for the next plant eject cycle.

Once ejected into plug retainers the plant root mass may be contained between small stainless steel plates (plug retainers) (which have the same pitch as the nursery tray) to control any movement of plants, after the plug retainers are loaded it is then indexed along by means of pneumatic cylinders driving a pawl wheel on the end of the plug retainer conveyor drive shaft. This is indexed one pitch at a time and transports the plants from the plug retainer belt to the plant transfer mechanism at the end of the plug retainer belt and just prior to the plant dropping from the belt into the plant transfer mechanism each cell is electronically scanned to sense whether a plant is in position or not, if no plant is sensed the conveyor is quickly indexed until a plant is sensed.

From the plug retainer belt, the plants are dropped into a transfer mechanism, and from the transfer mechanism, to planting discs and ultimately into the ground.

The transfer mechanism preferably reorientates the plants into the correct plane so as to be planted. When the plants are ejected onto the conveyor, they are 90° to the planting plane. Therefore they have to be relocated 90° to ensure that they are in the correct plane for planting. This is done by two sets of V-belts running alongside each other and running back to back and in the same direction. The belts are twisted 90° between the conveyor and planting discs.

Once the plants drop off the plug retainer belt into the transfer mechanism the root mass is held between the V-belts and transferred down and rotated 90° in the process where the plant foliage is introduced to the planting discs as the planting discs rotate at ground speed, then grip the plant foliage, (transfer mechanism is also travelling at ground speed) and rotate it around and at the correct position, the discs separate allowing the plant to be accurately placed into the furrow in the ground created by a plough shoe. After planting the soil is compacted around the plant and tamped down by tamping wheels at the rear of the field planter frame.

The machines are driven by these tamping wheels which have drive paddles welded around their circumference which in turn chain drive the planting discs and transfer mechanism. For different nursery tray flats to be used the whole tray roller frame including plant eject frame and conveyor assembly is easily removed and another assembly which suits the new tray may be bolted onto a machine.

Preferred embodiments of the present invention will now be described with reference to the accompanying drawings in which:

FIGS. 10c, 10d, 10e and 10f illustrate a particularly preferred form of indexing mechanism in three different operational positions;

FIGS. 11a to 11d are views illustrating features of the plant ejection frame for ejecting plants from the trays in which they have been grown;

Figure 16:
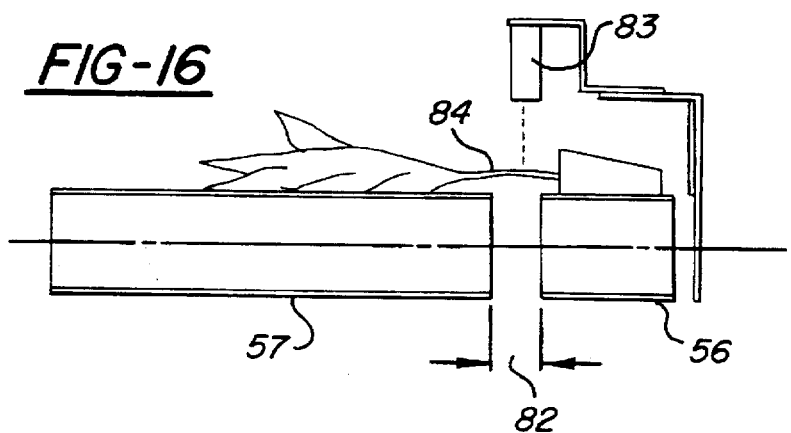
Figure 17:
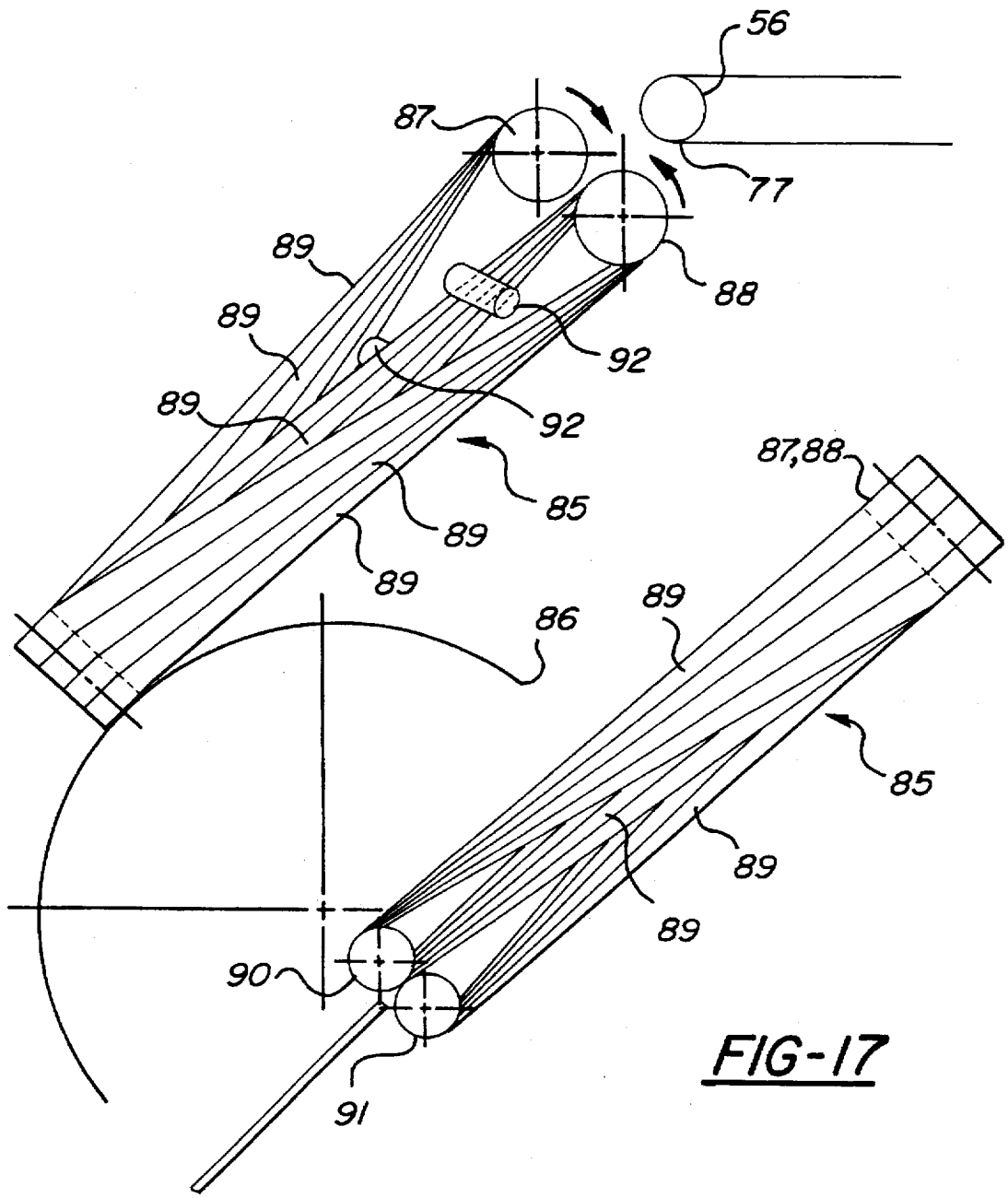
Figure 18A:
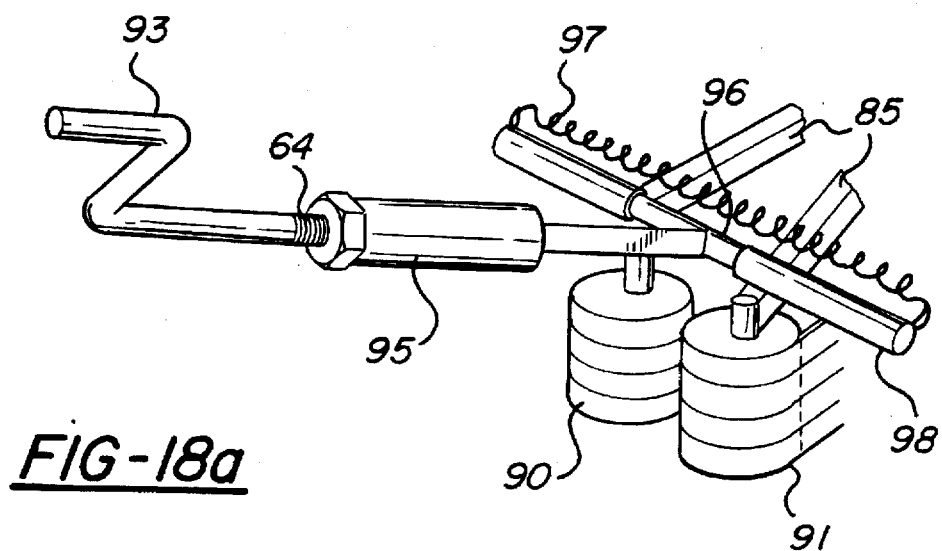
Figure 18B:
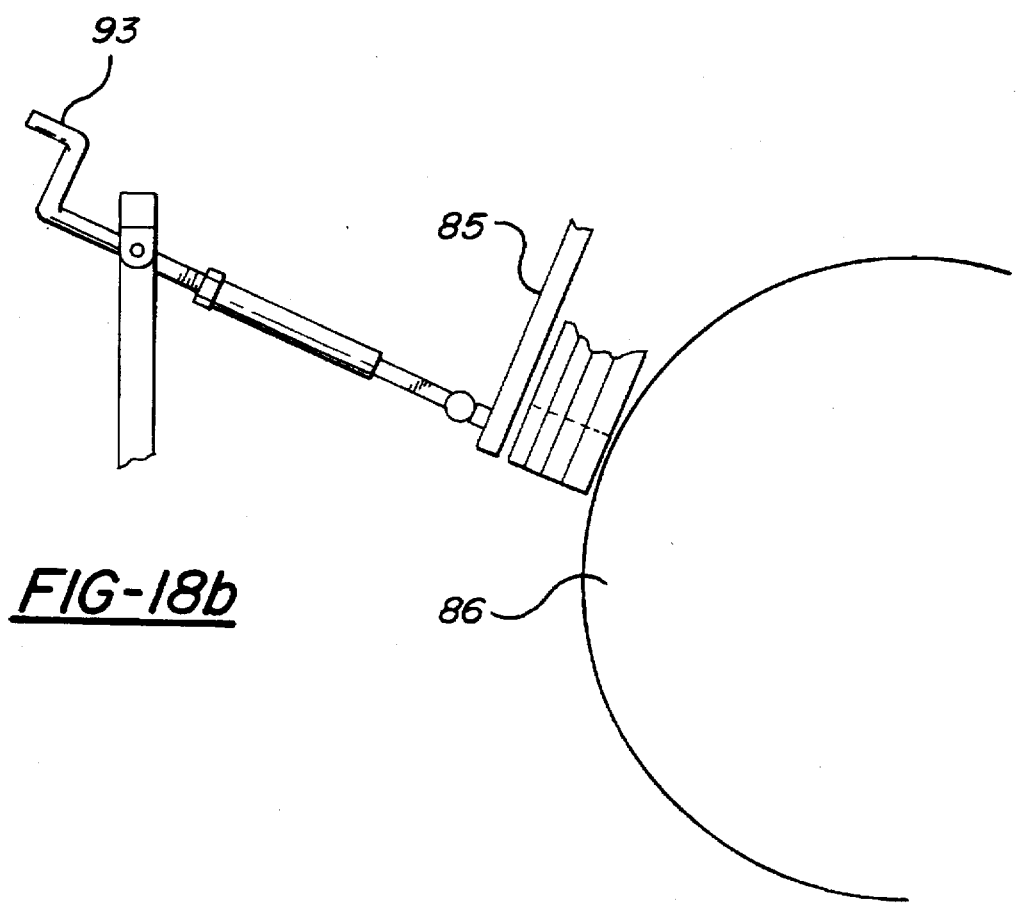
Figure 19:
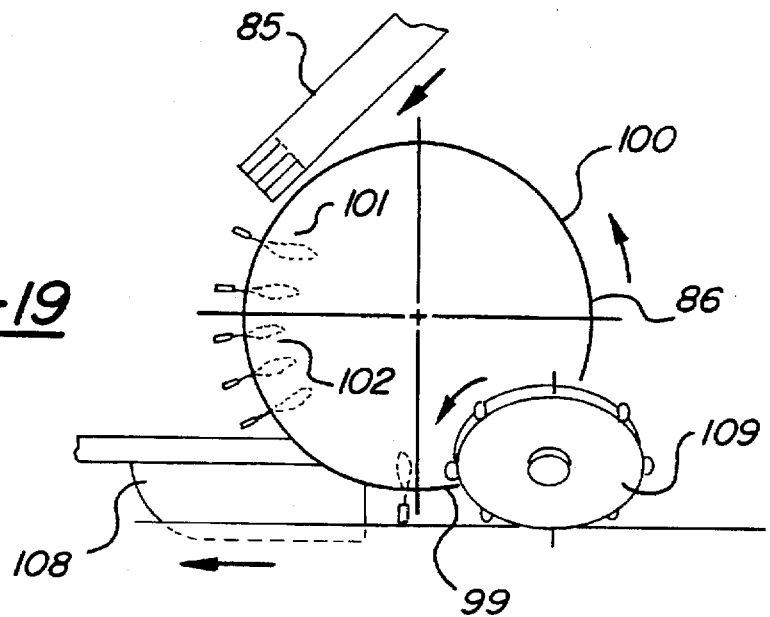
Figure 20A:
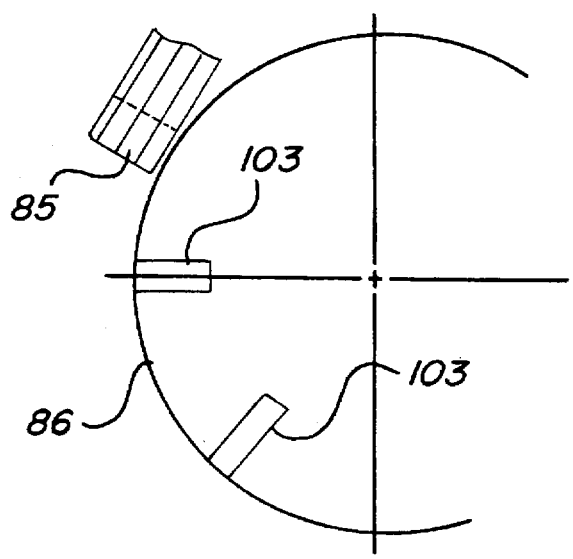
Figure 20B:
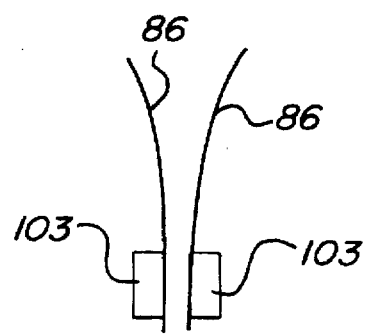
Figure 21:
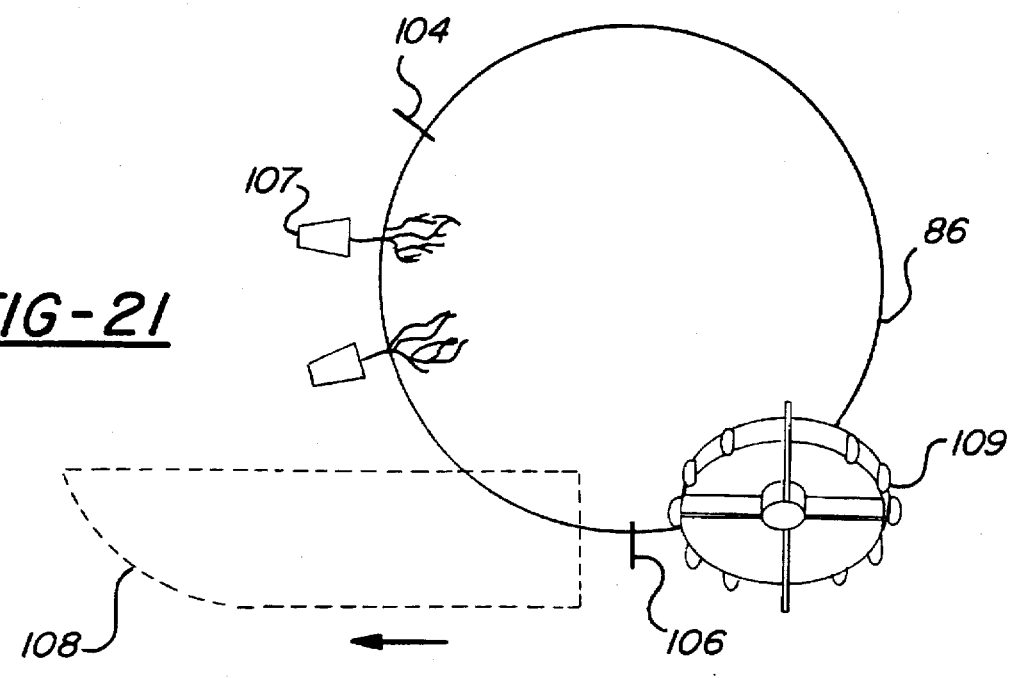
Figure 22:
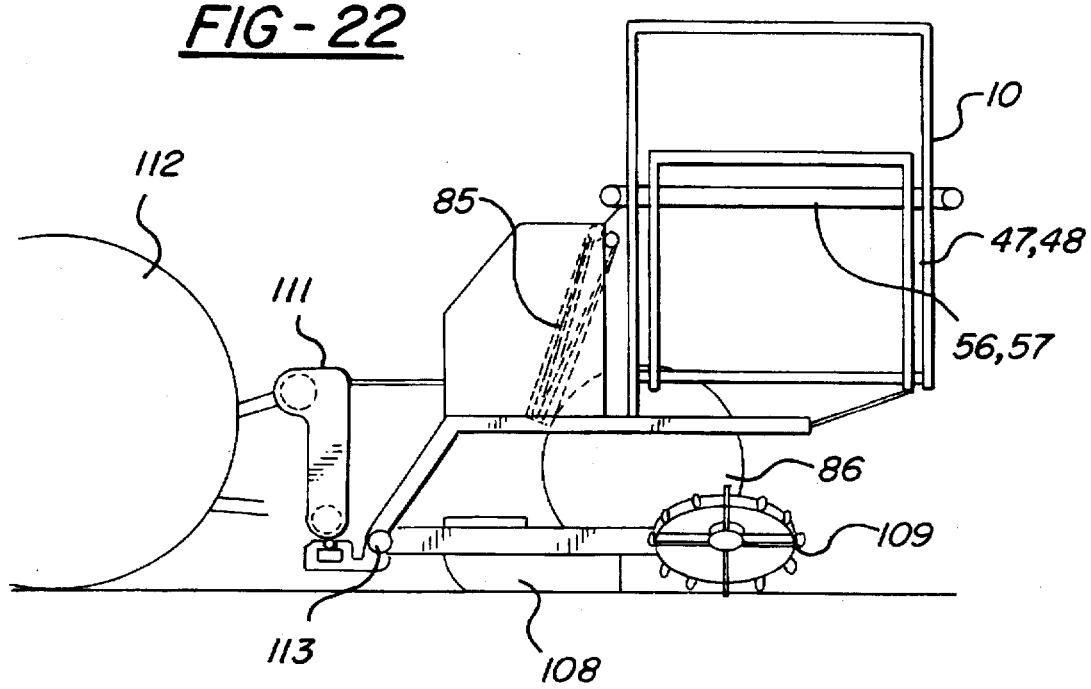

FIGS. 15c to 15g and illustrate alternative apparatus for handling plants as they leave the retainer belt;

FIG. 16 illustrates a scanning device for determining the position of a plant stem on the retainer belt arrangements;

FIG. 17 illustrates a transfer conveyor for reorienting and transferring plants to a planting arrangement;

FIG. 18 and 18b illustrate the lower end of the transfer conveyor shown in FIG. 17;

FIG. 19 illustrates the planting arrangement according to a preferred embodiment of the present invention;

FIGS. 20a and 20b show detailed features of the planting arrangement shown in FIG. 19;

FIG. 21 is an enlarged, side elevational view of a portion of the planting apparatus; and FIG. 22 is a schematic view showing an overall assembly of apparatus according to a preferred embodiment of the present invention.

Figure 1A:
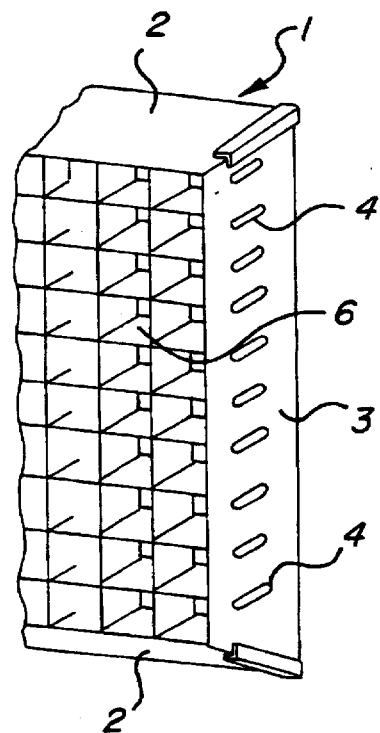
FIGS. 1a, 1b and 1c are top and bottom partial perspective views and a cross-sectional view respectively of nursery growing containers of the general type which might be used in machinery according to the present invention.
Figure 1B:
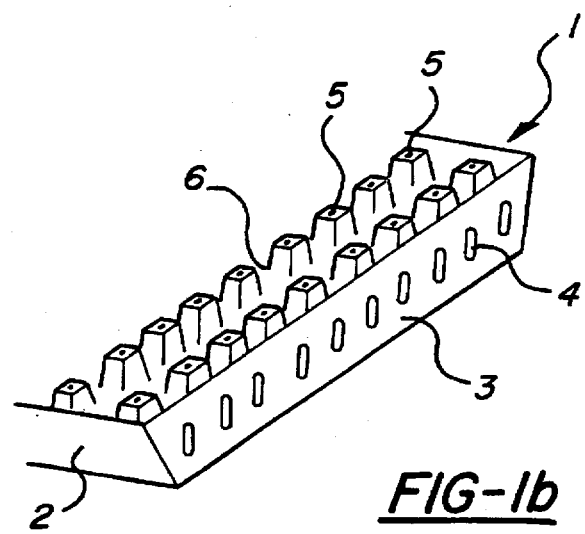
Figure 1C:
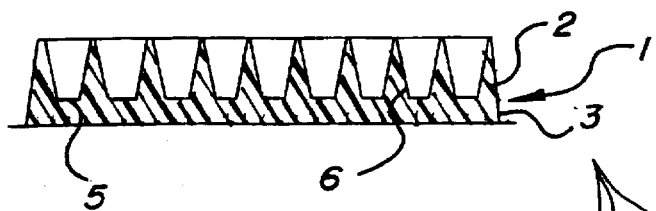

Referring to FIGS. 1a, 1b and 1c, there is shown the trays 1 used in machinery according to the present invention. The trays may be rectangular in configuration with cells 6 arranged in transverse rows and longitudinal columns within transverse external walls 2 and longitudinal side walls 3. Indexing means 4 in the form of slots, indents, ribs, outer cell cavities or the like are provided in the longitudinal side walls 3 for cooperation with an indexing mechanism described hereinafter. Furthermore, drain holes 5 are provided through the base of each cell 6 which not only allow water to drain through the cells but also allow an eject mechanism (described later) to eject plugs from the tray during planting operations. The trays may be made from rigid plastics material or any other suitable material.

The contents of each cell 6 comprises a propagating medium and, normally, a seedling appropriate for transplanting. Sometimes, however, a seedling does not propagate or is immature. If a seedling is missing or not sufficiently mature to grow in the field undesirable gaps exist between adjacent transplanted plants.

Figure 2:
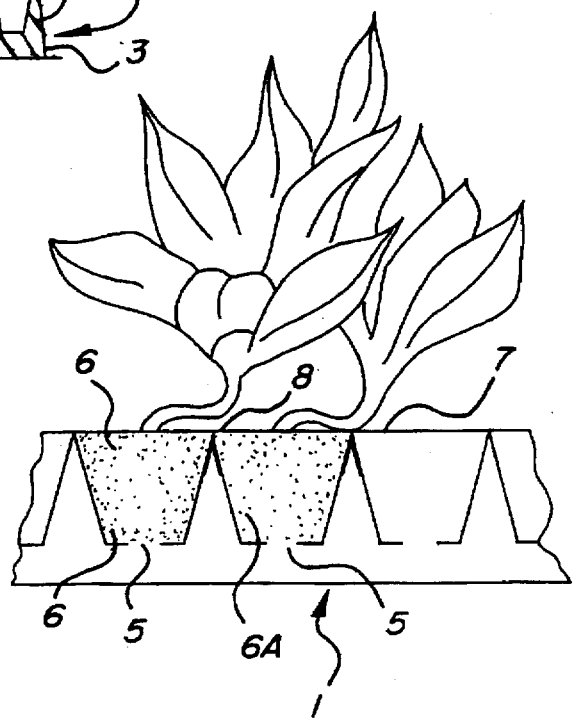
FIG. 2 illustrates how some plants can grow in seedling trays of the type shown in FIGS. 1a, 1b and 1c.

FIG. 2 shows how it is relatively common for seedlings grown in trays of the aforementioned kind to not necessarily grow straight up from their own cells. Plants can often be affected by mildew, heavy early watering, wind, forced growth or low light which may result in the plants bending over generally horizontal to the top 7 of the tray 1 with stems close to or touching soil in the tray cells 6. This can extend to the stage where the stem rests on or passes over the adjacent cell lip 8. As the plant strengthens and grows, it may then grow upwardly in the adjacent cell 6A. Moreover, the plant foliage (during the growth cycle) tends to intermesh and cling together, thus causing interference. When adjacent plugs and plants are removed mechanically, the intermeshing of the foliage causes difficulties during transplanting using automatic machinery.

Figure 3:
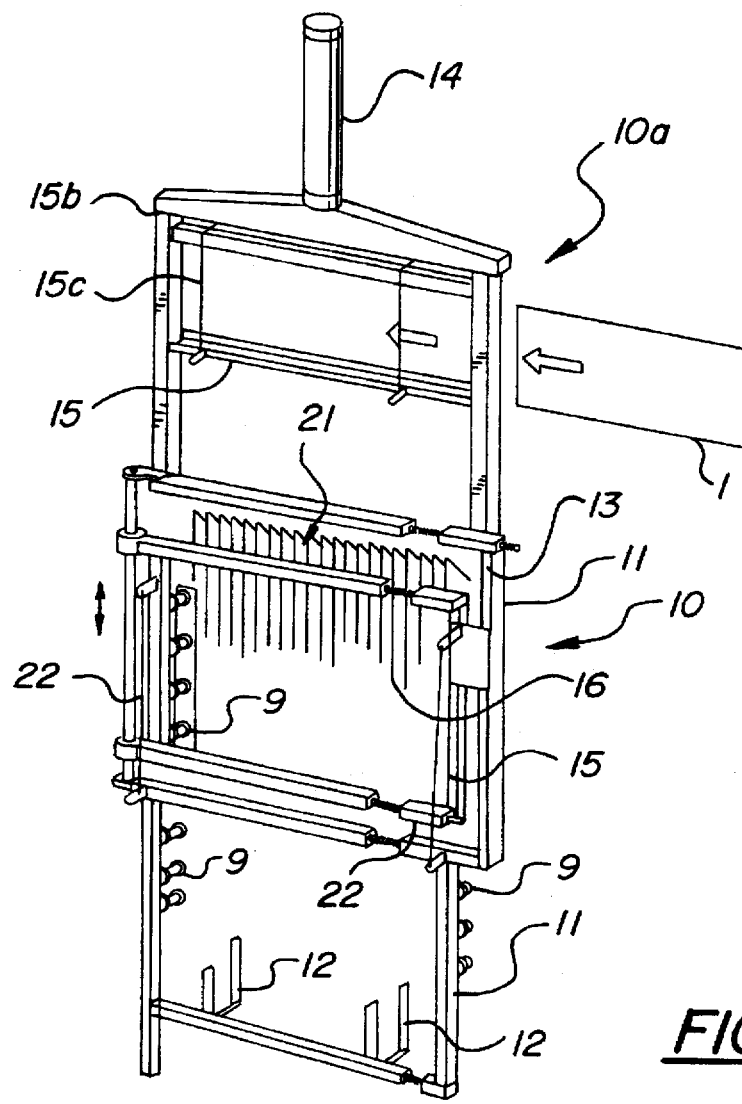
FIG. 3 is a perspective view illustrating a roller frame for handling seedling trays during the process of transferring seedlings therefrom.
Figure 3B:
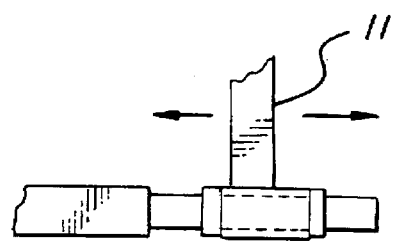
FIGS. 3a and 3b are detailed views showing aspects of the roller frame of FIG. 3.
Figure 3A:
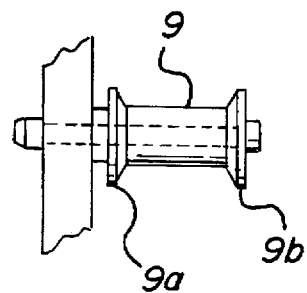

FIG. 3 of the accompanying drawings illustrates the general configuration of the roller frame 10 permitting seedlings on trays 1 to be loaded at an upper loading position 10a and thereafter they are moved downwardly as described hereinafter to be transferred from the trays in a planting operation. The roller frame 10 consists of a series of rollers 9 (each complete with a shaft and bearings) with side flanges 9a, 9b to contain the trays 1 (see FIG. 3a). One side rail 11 of the roller frame 10 is transversely adjustable (FIG. 3b) so that the rollers 9 can be set up exactly to the required tray width to suite specific trays and dimension shafts due to variations in temperature. After the trays 1 have been emptied of their plants (as described hereinafter), the trays drop to the bottom of the roller frame 10 where they are contained by a support frame 12 for manual removal.

Figure 4A:
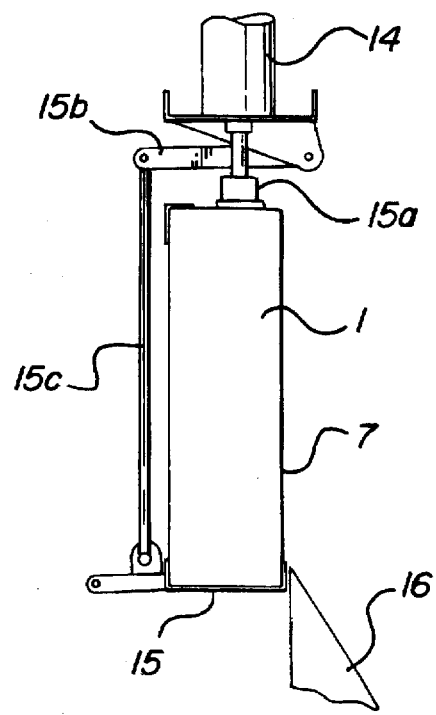
FIGS. 4a and 4b are detailed views of the top loading zone 10a of the roller frame of FIG. 3.
Figure 4B:
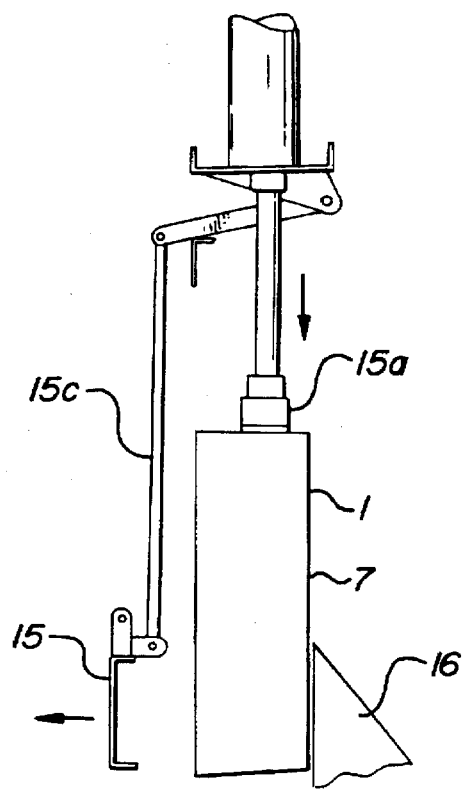
Figure 5A:
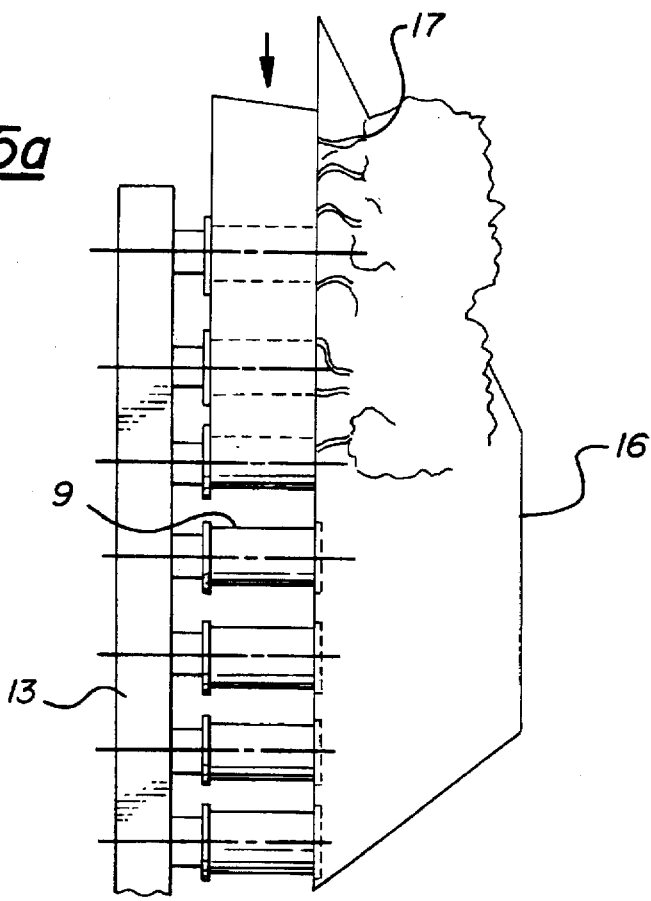
FIGS. 5a and 5b are respectively a side elevational longitudinal section view and a perspective view of the zone of the roller frame of FIG. 3 showing the separating comb region.
Figure 5B:
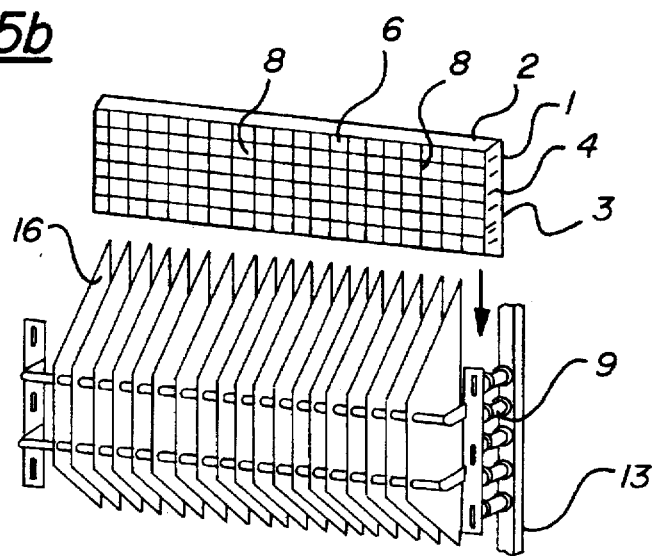

FIGS. 4a and 4b show in greater detail the top loading zone 10a. Mounted on top of the roller frame 10 is a top loading cylinder 14. The trays 1 are loaded from the side into a loading support channel 15. A safety door (not shown) is closed in locked position and a roller attached to the safety door ensures that the tray is pushed fully into position. When the door is shut, it activates an air valve which permits the top loading cylinder 14 to operate and extend the push bar 15a as shown in FIG. 4b. The loading support channel 15 swings 90° out of the way of the tray 1. At the same time, the cylinder 14 pushes the tray 1 downwardly. A plurality of pointed comb plates 16 (FIGS. 5a and 5b) are provided adjacent to or sliding on the top surface 7 of the tray 1 as it moves downwardly with each plate 16 in line with a lip 8 dividing adjacent columns of cells. The combs 16 raise any low stems and separate plants into defined columns separated by comb plates. Friction of the plant foliage on the plates 16 holds the plants at a slightly upward angle allowing the lower rows of plants to be mechanically extracted as described hereinafter. The force required to separate foliage and plants is considerable and it is desirable not to transfer force to lower trays which are in the process of being precisely indexed row by row for the horizontal transfer of plants. This is achieved by the use of an infra-red scanner that identifies the transverse edges of trays tp ensure that the upper surface of the lower tray is in the right precise position when indexed for the commencement of the down loader stroke (see the following description of tray indexing and down loading).

The top loading cylinder 14, after mechanically reaching the extent of its travel, positions the tray beyond the point of maximum force required to separate the plants and precisely positions it ready for indexing. The cylinder 14 immediately returns to the up position and the push bar 15a engages against arm 15b (FIGS. 4a, 4b) which applies an upward force on vertical connecting rods 15c which are connected to the tray support channel 15 pulling it into a precise horizontal position ready to receive another tray 1 of plants.

Referring against to FIG. 3, the complete upper frame assembly 21 including the tray loading zone 10a, the separating comb plates 16, the guide rollers 9, and the down loader and indexing mechanisms are all mounted in a frame (which is an integral part of the roller frame) to allow for the vertical raising or lowering of this assembly 21 via two pneumatic cylinders 22. This entire upper plant transfer from tray container to plug retainers and final foliage separation roller frame mechanism is lowered via the pneumatic cylinders 22 until the bottom of the separation combs 16 make contact with plant containers 23 on a primary plug retainer conveyor belt 56. The lower edge of the separator comb plates 16 have a long inclined angular protrusion 25 equal to the width of the plant container upper retention flange 24. The purpose of this angular protrusion is to move the plant stem across and when the tray container 1 indexes down one row it ensures that the stem 26 moves into a receiving gap 27 at the top of the plant containers 23. After the tray has been indexed down one row and the plant stems engaged in the retention slots 28, plant extraction prongs 48 push the complete row of plugs into the plant containers 23. Any foliage of these plants (previously separated into vertical columns by the separation combs 16) may still remain at least partially tangled between transverse rows in these columns. This, if it is allowed to remain, could cause misalignment or damage when the plant plug retainer belt 56 begins to move. To avoid such problems, the top assembly is vertically moved upwardly as indicated by arrow 30 by a distance 29 sufficient to ensure the foliage of the plants on retainer belt 56 is completely separated from that of plants remaining in the tray 1.

Figure 8A:
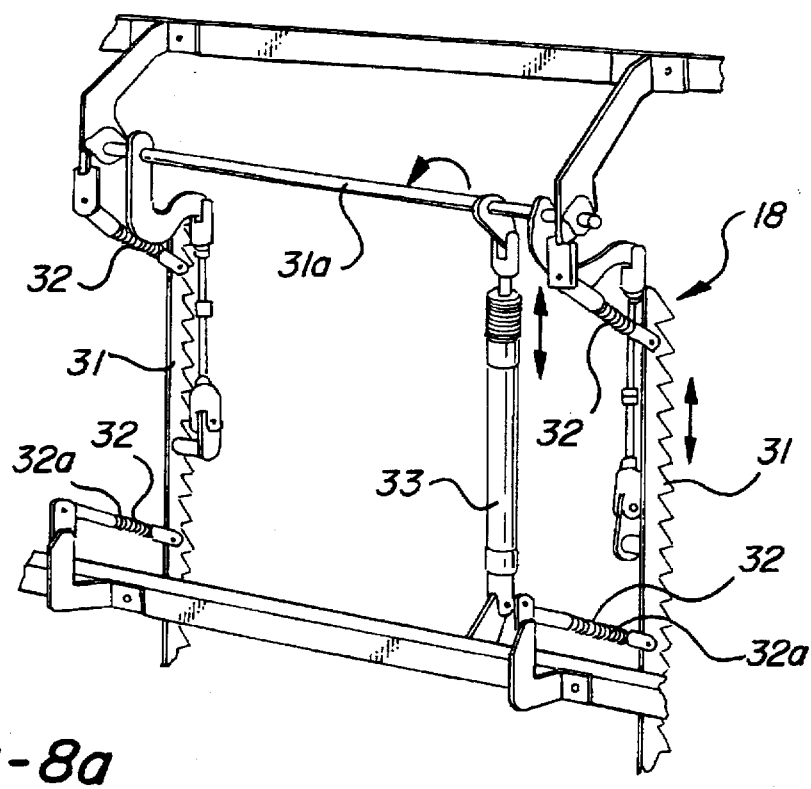
FIGS. 8a and 8b are respectively a perspective view and side elevational view of a down loader mechanism for the tray containers.
Figure 8B:
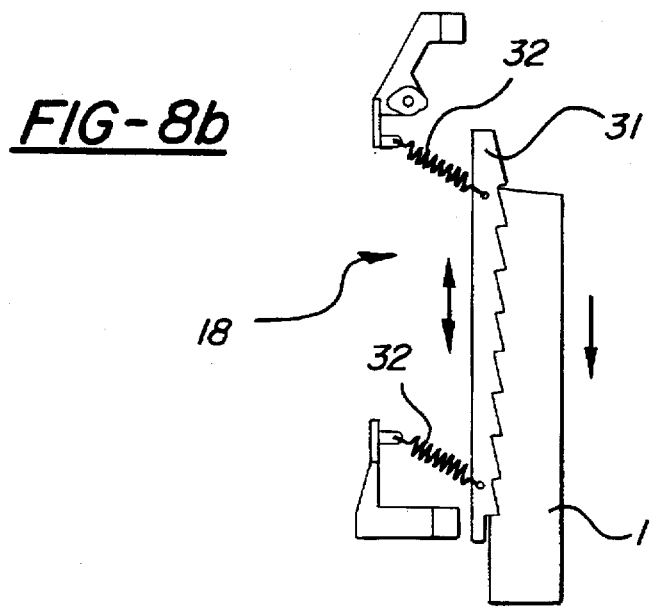

Referring now to FIGS. 8a and 8b, a tray down loader mechanism is illustrated for feeding the lower tray containers downwardly towards a position where they can be precisely indexing during plant transfer processing. The lower trays 1 are assisted downwards by a down loader mechanism 18 which includes a toothed rack device 31 and spring assembly 32 which is mounted on the roller frame 10. The down loader mechanism 18 is pneumatically operated via an air cylinder 33 until the tray 1 is engaged in an indexing mechanism (described hereinafter). The down loader mechanism 18 therefore keeps the trays 1 generally urged downwardly so that any tray engaged in the indexing mechanism has a gentle downwards pressure thereon. This pressure can be adjusted by means of a pressure regulator cylinder 33 which raises the toothed rack devices 31 which, in turn, are held parallel relative to each other by an interconnecting torque tube 31a. The spring assembly 32 and a travel limit slide assembly 32a keep the toothed rack devices 31 parallel to the tray 1 and maintains pressure evenly on both ends of the tray 1 preventing any misalignment. When the down loader mechanism 18 is being raised by extension of the cylinder 33, the angular sloped teeth of the rack device 31 ratchets up the tray face engaging on the top of the tray. Thereafter the cylinder 33 retracts and the trays are pulled downwardly.

FIGS. 9a to 9d of the accompanying drawings illustrate a tray release mechanism 19. This mechanism 19 permits trays to be dislodged from both the indexing mechanism 118 and the tray down loader mechanism 18. The release mechanism 19 is mounted on the machine and includes a cross bar 113 which runs across the back of the roller frame 10. A guide 114 is provided on each end of the cross bar 113, the guides 114 engaging on the outside of arms 115 carrying the index mechanism 118. One of these two guides 114 has a handle 116 such that when the handle 116 is pulled down, these guides 114 engage on the outside of each indexer arm 115 sliding down the sloped edge section 117 overriding indexing spring pressure and pivoting the indexing mechanism 118 about pivot points 19a and away from the trays 1. The guides 114 may engage in the notches 115a.

Figure 9A:
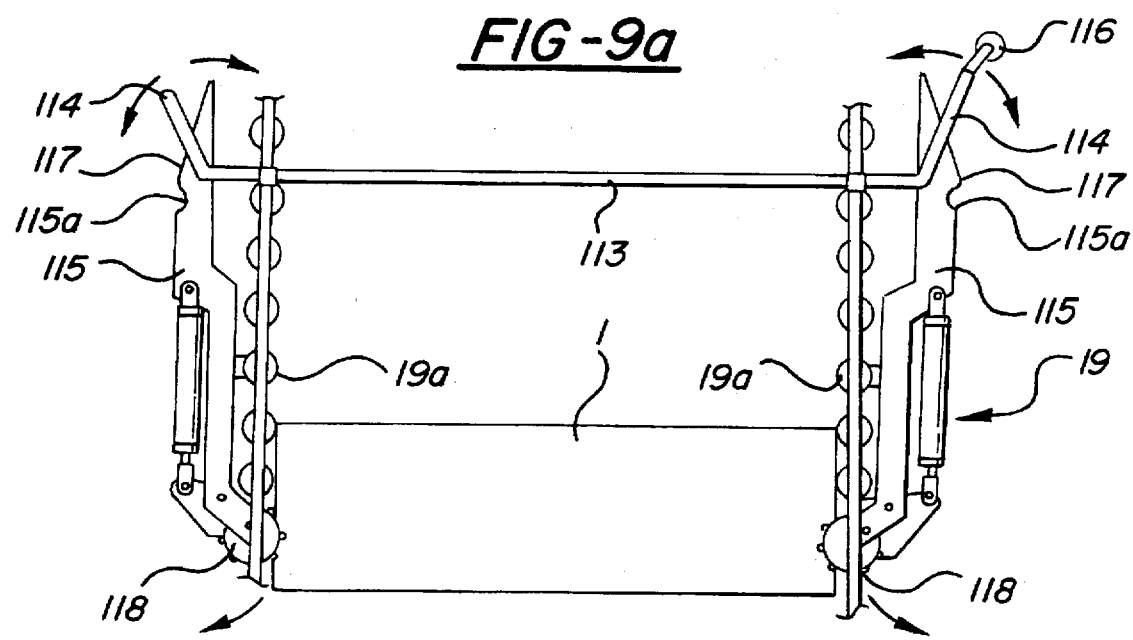
FIGS. 9a to 9d are views illustrating a tray releaser mechanism.
Figure 9B:
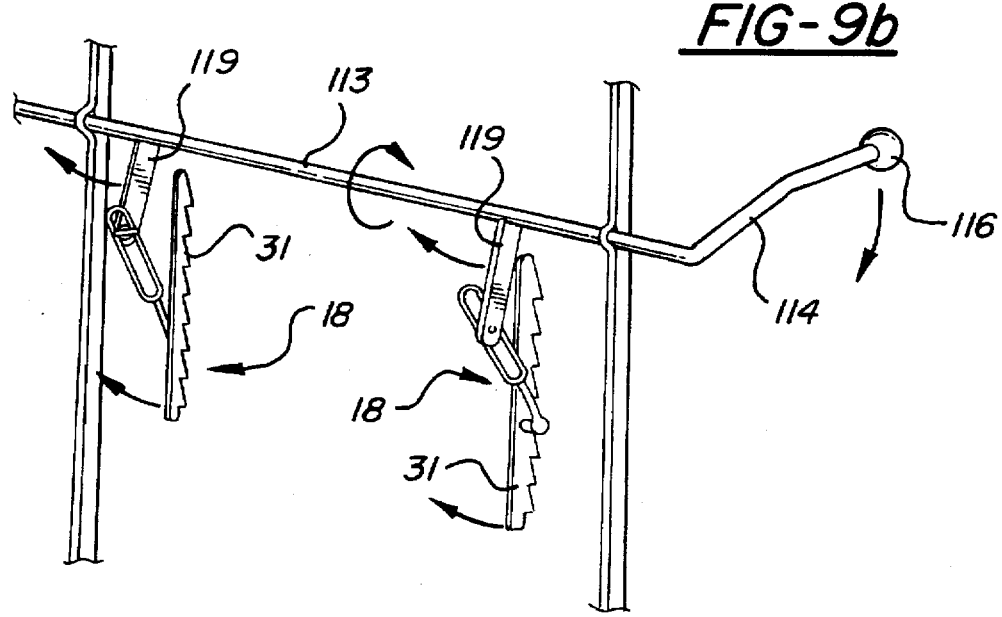
Figure 9C:
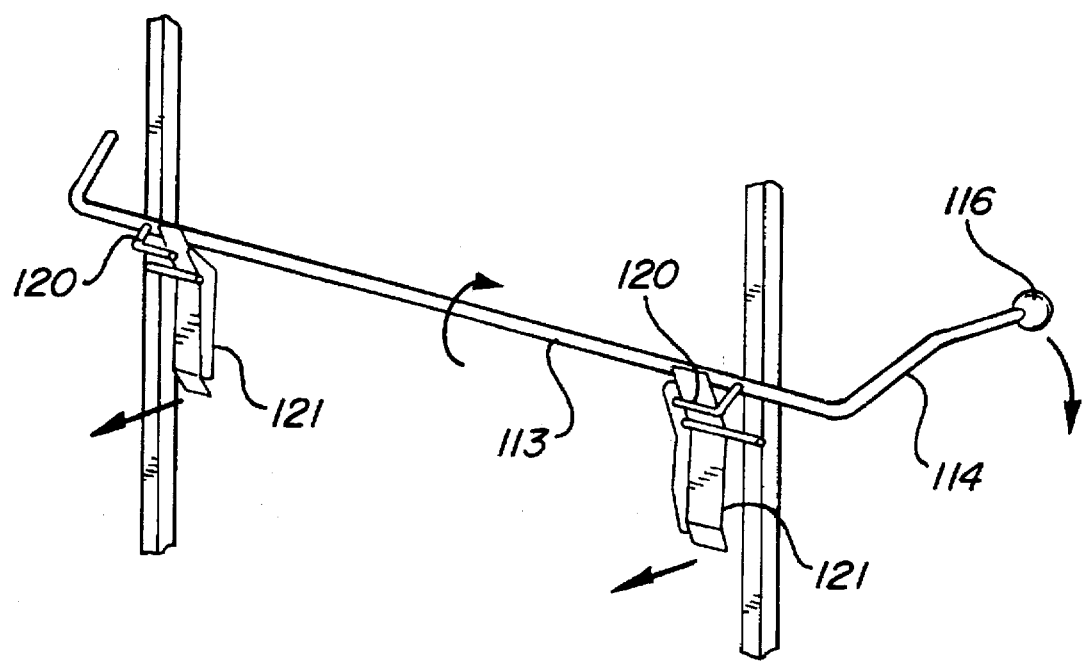
Figure 9D:
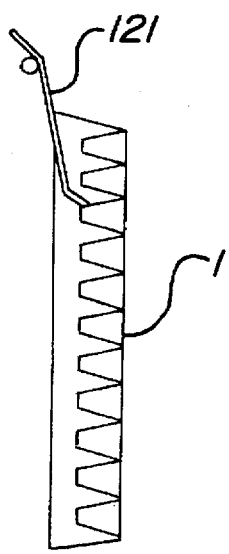

As shown in FIG. 9b, the same device enables the down loader mechanism 18 to be disengaged from the trays to facilitate easy removal of the trays. By pulling the handle 116 downwardly, the cross bar 113 is rotated which raises the down loader arms 119 thereby raising and pulling back the toothed rack devices 31 thus disengaging same from the trays. Moreover, at the same time, tray lock pawls 121 are also disengaged using the cross bar mechanism 113 (FIGS. 9c and 9d). Pawl arm guides 120 engage on top of the lock pawls 121 and pull them away from the tray 1. The tray lock pawls 121 engage in the gap between cells 6 in the trays 1 on the back of the tray and rest on the top of the cell. This ensures the tray (which is housing seedlings transferred therefrom) does not move upwardly when the down loader mechanism 18 ratchets up with the sloping upper surfaces of the teeth on rack devices 31 sliding against the tray 1.

Figure 10A:
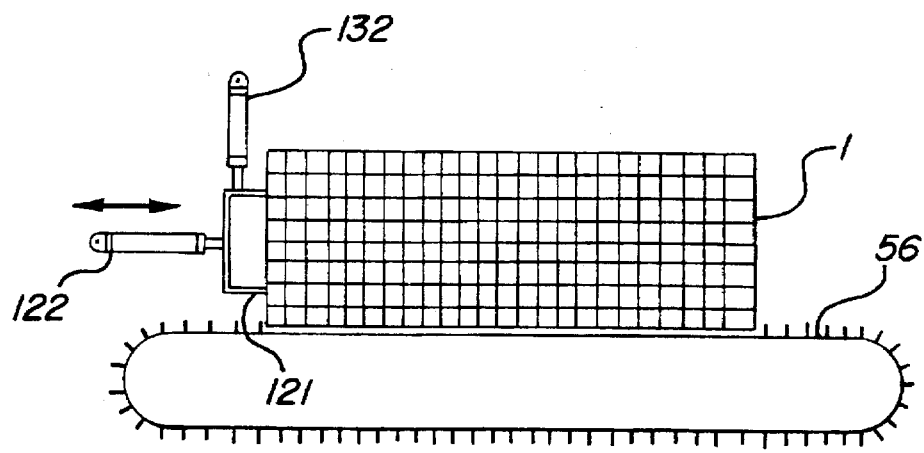
FIGS. 10a and 10b illustrate alternative forms of indexing mechanisms.
Figure 10B:
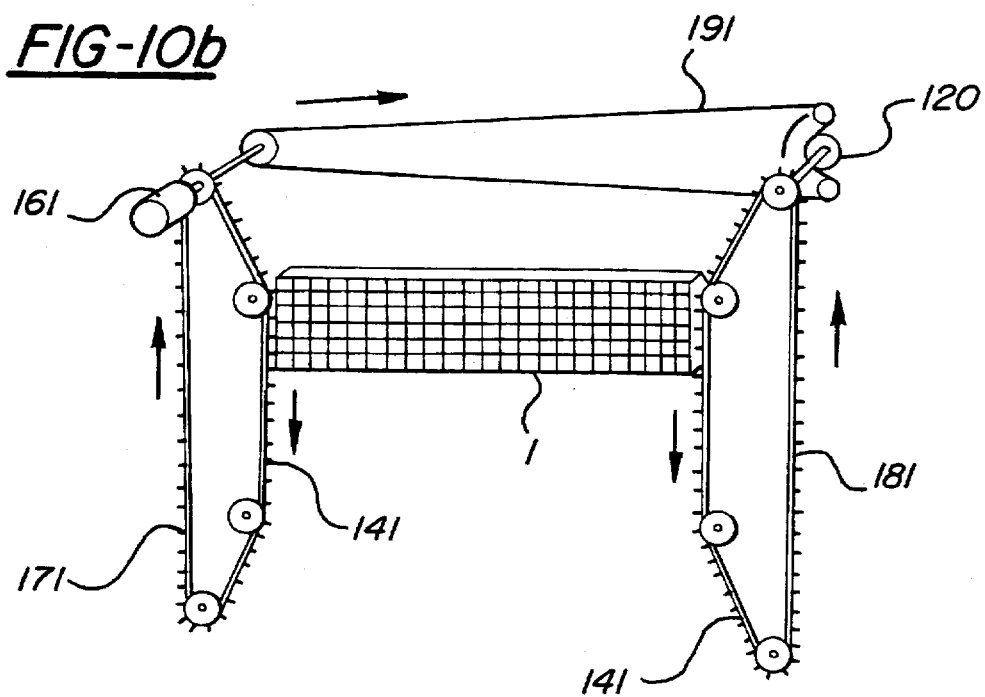

Possible forms of alternative downward movement mechanisms are illustrated in FIGS. 10a and 10b. In the embodiment of FIG. 10a, pegs are linked together and pneumatically actuated via cylinders 122, 132. Cylinder 122 pushes pegs 121 into the tray slots 4 and then cylinder 132 pushes down indexing the tray one pitch at a time. The plant eject sequence commences then after the plants have been ejected onto the conveyor 56, the cylinder 122 pulls pegs clear and cylinder 132 retracts the frame upwardly ready for the next indexing sequence. Another possible embodiment is shown in FIG. 10b and entails the use of chains and sprockets. Mounted on the chains are pegs 141 which engage in slots 4 in the side faces 3 of the trays 1. The chain 171 is mechanically indexed via a rotary actuator 161 which turns at a tray pitch at a time. The two chains 171, 181 are connected by a cross chain 191 and a reversible sprocket 120 set up to ensure chain 181 operates in the opposite direction to the chain drive 171.

FIGS. 10c to 10e illustrate a preferred means of precisely indexing the trays using an indexing mechanism 118. The figures show three successive positions during an indexing step. The mechanism comprises a freely rotatable indexing wheel 34 having a plurality of axial pins 36 disposed on a constant radius from the axis of rotation of the wheel and an indexing cam 35 rotatable about an axis of rotation 35a by a pneumatic cylinder 42. The wall 3 of tray 1 is illustrated with indexing slots 4 engageable with the pins 36 of the wheel 35. In FIGS. 10c to 10e the pins 36 have been numbered 37', 38', 39' and 40' and these pins are adapted to engage in slots 4 which have been numbered 37, 38, 39 and 40 respectively.

FIG. 10a shows the tray 1 engaged and ready for a plant ejection step. In this case, pin 38' is engaged in slot 38 and pin 40' is engaged by the cam face 41 of the indexing cam 35. After plant ejection, the indexing cam 35 is pneumatically operated via cylinder 42 (FIG. 10c) and rotates clockwise disengaging pin 40' and placing the lower face 44 in the path of pin 43'. The cam plate is in position for face 44 to engage pin 43' before pin 38' is released and the tray 1 drops with assistance from the down loading mechanism 18 until pin 43' hits the face 44 of the cam plate. Immediately this happens, a signal is sent to the cylinder 42 and it retracts disengaging the cam plate from pin 43' and placing the top of cam surface 41 in the path of pin 45'. The tray continues to drop until pin 45' hits and engages the cam plate 35. Thus, the tray has been indexed one positive pitch with pin 39' now in slot 39 and is in precise position for plant ejection again. FIGS. 11a to 11d illustrate operation of the plant ejection frame 47 which is pivoted at 50 to the roller frame 13. Plant ejection is again controlled by pneumatic cylinders 46 which cause the frame 47 to move in and out. The prongs 48 engage in drain holes 5 and push on the base of the plants 49 in the cells of tray 1 ejecting them onto a plug retainer belt 56. The length of the radius arm 51 and the curve of the prong 48 are designed so that the prong 48 remains central to the drain hole 5 over the complete length of stroke. Preferably the eject prong is curved so that it remains a constant distance from the lower side wall of the cell side wall 53 (FIG. 11d). By this means the smaller tip of the root mass, wedge shaped plug 49 remains relatively central and in contact with the eject prong tip. Conveniently, the eject prongs 48 to assist on entry into the drain holes 5. Furthermore, the prongs 48 are preferably waisted at 55 and made from high tensile flexible material to allow for deflection of the tip of the eject prong to maintain central alignment while allowing for expansion and contraction of trays due to temperature extremes.

Figure 12A:
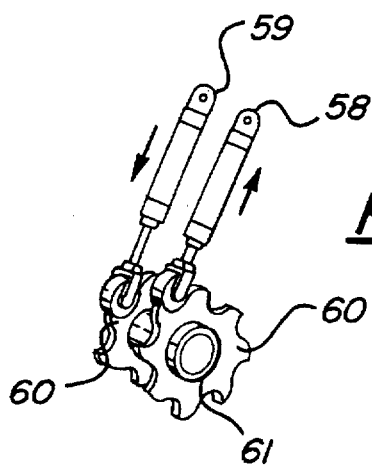
FIGS. 12a to 12g are views illustrating features of the plant/plug retainer belt arranged to receive plants from the trays after ejection therefrom.
Figure 12B:
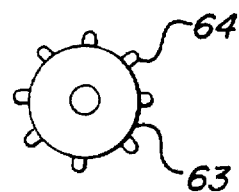
Figure 12C:
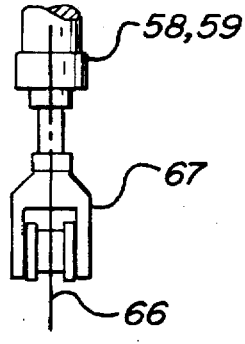
Figure 12D:
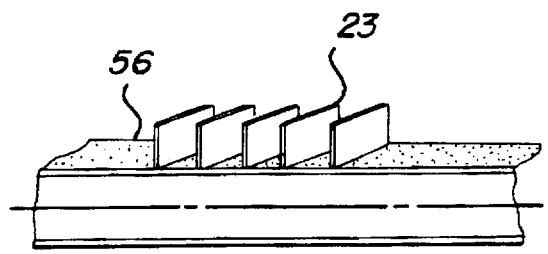
Figure 12G:
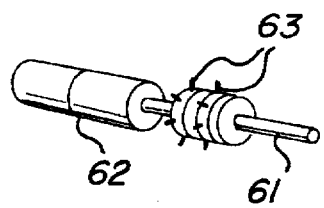
Figure 12E:
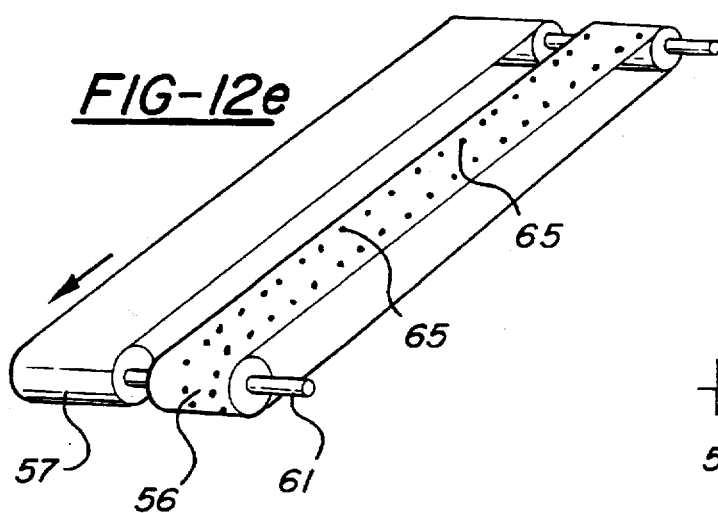
Figure 12F:
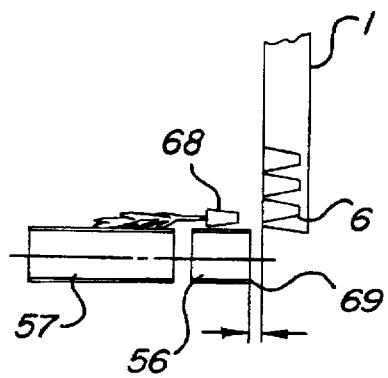

FIGS. 12a to 12e and 13 show details of the plant/plug retainer belt arrangement. The arrangement may comprise one belt but preferably includes two belts 56, 57 mounted to the same shafts and running parallel to one another. The primary belt 56 carries the plug container and plugs and the secondary belt 57 carry plant foliage. As shown in FIG. 12a, the conveyor belts 56, 57 are driven by two pneumatic cylinders 58, 59 driving two sprocket wheels 60 which are attached to the drive shaft 61. The conveyor drive roller 62 (FIGS. 12b, 13) has opposed side members 63 in which drive pegs 64 are located. These drive pegs engage in holes 65 which are accurately positioned in the primary conveyor belt 56. This arrangement drives the primary conveyor 56 and maintains precise position control for plant retainers 23 (FIG. 12d). The drive cylinders 58, 59 have rollers 66 mounted in a clevis 67. These rollers 66 engage in the formed sprocket teeth of sprocket wheels 60. As one cylinder extends and indexes the sprocket one pitch, the other cylinder is retracting ready to push when the first cylinder has completed its stroke and starts to retract. This means that speeds are doubled yielding a speed of indexing of 8 cells/second. This racks the plant retainers 23 and belt 56 along one pitch at a time. On the belt 56, and at the same pitch as the nursery tray, plug retainers 23 are fixed to the primary conveyor 56. These act as containers for the ejected plugs to fit into. This stops any movement and keeps the plugs contained. There is minimal clearance 69 (FIG. 12d) between these retainers 23 and the nursery tray 1. This allows a smooth exit of the plug from the tray cell 6 and a smooth entry into the plug retainer.

Figure 13:
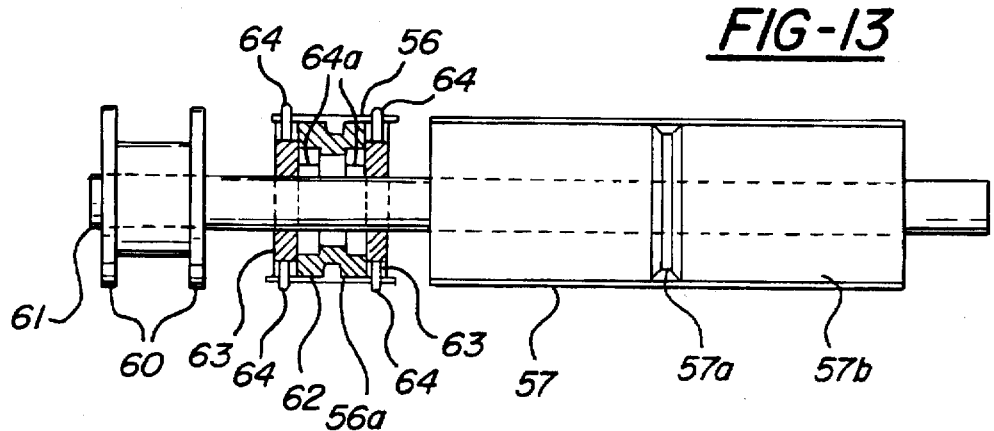
FIG. 13 is a cross-sectional view of the drive roller for the plant/plug retainer belt shown in FIGS. 12 to 12g.

Referring to FIG. 13, the belt 56 is supported by pulley 62 and is kept in line by a central V tracking strip 56a. To allow for the frictional forces of the belt support roller which has an accumulation variance over time to the precise position control of the engaged drive pins 64 this variance is equalised by means of bearings 64a. As timing and position control for the foliage support belt 57, is not critical, it is supported and driven by roller 57 which is fixed to the drive shaft 61. The belt 57 is kept aligned by the V tracking strip 57a which engages in a V recess in the roller 57b.

Figure 6A:
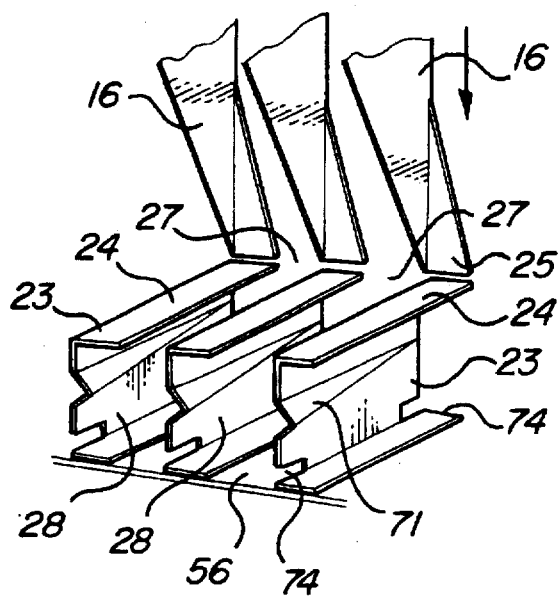
FIGS. 6a and 6b are respectively perspective and side elevation views showing the plant receiving zone and conveying means when plants are transferred from a tray container.
Figure 6B:
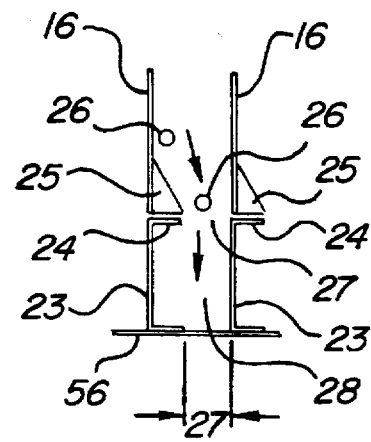
Figure 7A:
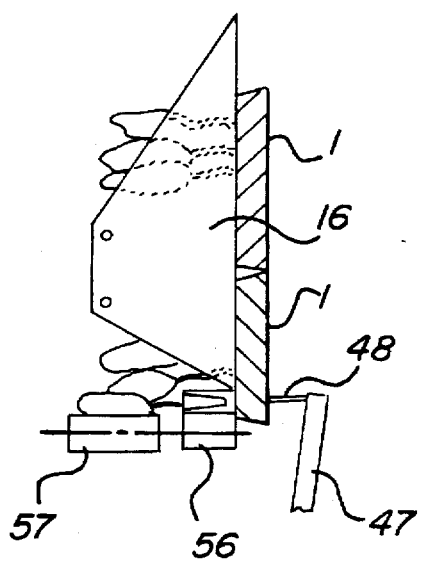
FIGS. 7a and 7b are schematic, sectional side views of the zone shown in FIGS. 6a and 6b showing differing positions of a plant eject mechanism.
Figure 7B:
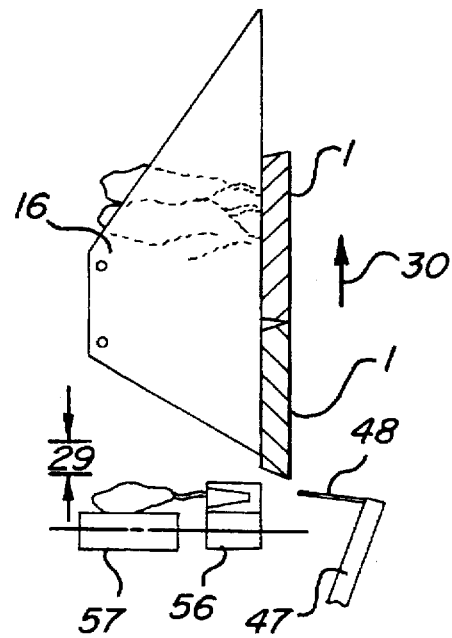

As shown in FIG. 6a, the plug retainers 23 may have a protruding tapered V 71 which causes friction to be applied on the side of the plug to maintain pressure between the protrusion 71 and an opposing plug retainer all 23. This helps to prevent side movement of the plug. The lower edges of the base of the plant retainer plates 23 may have notches 74 formed therein on either side to receive angular keeper plates which ensure belt adjustment and resistance to side forces exerted at the time of the plug transfer.

Figure 14A:
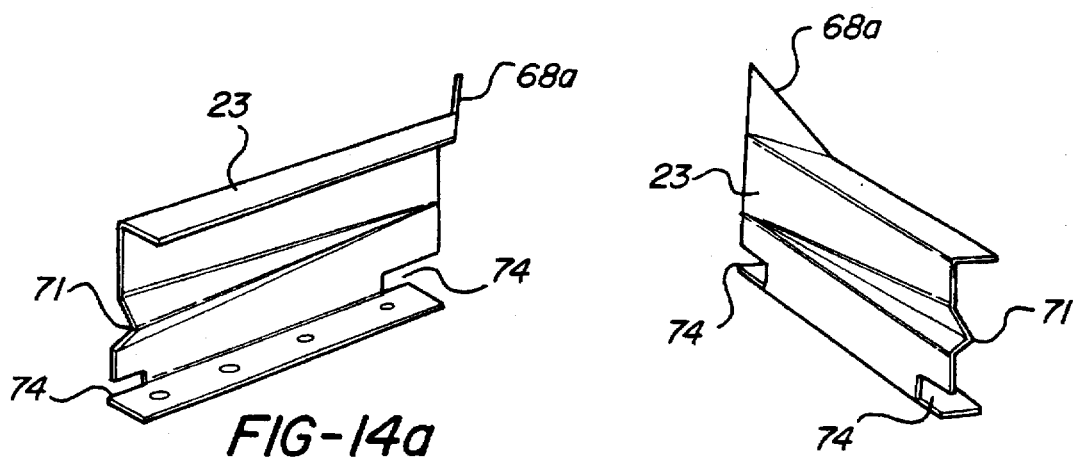
FIGS. 14a and 14b are perspective views of a possible alternative form of plug retainer plate.
Figure 14B:
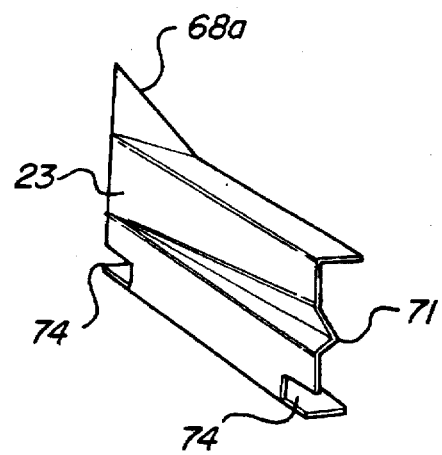

A further embodiment of a plant/plug retainer 23 is shown in FIGS. 14a and 14b. In these figures the retainer 23 has an angular protrusion 68a on the top rear end of the retainer. This will act as a guide (similar to 25 of FIG. 6a) for the plant when the tray is indexed downwardly first prior to plant/plug ejection. Using this arrangement, the comb 16 may not be necessary and may be used for different tray forms and lower cost machines.

Figure 15:
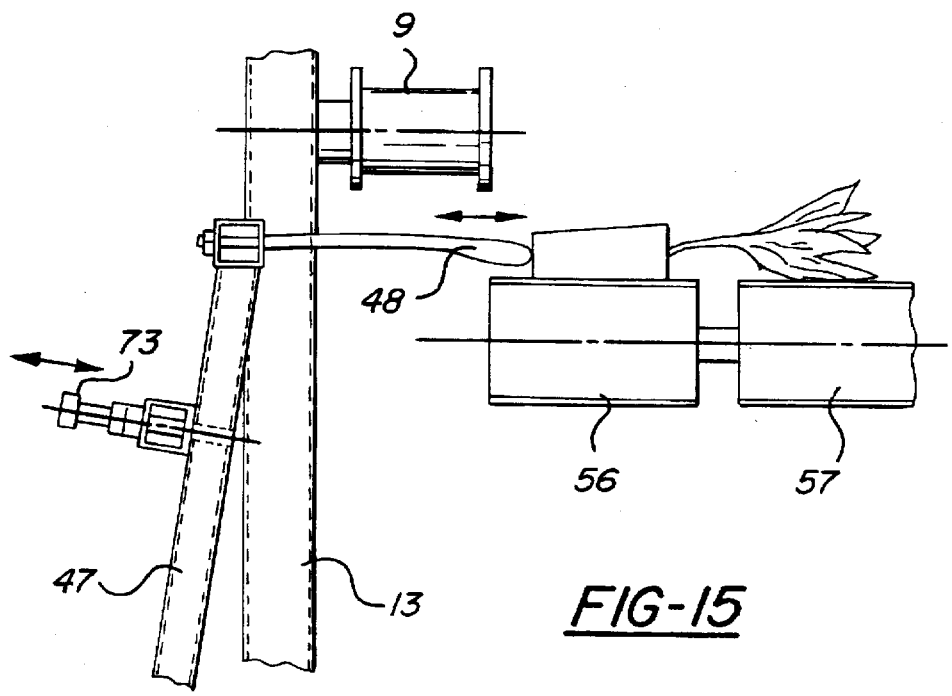
FIG. 15 shows a detailed view of the plant eject mechanism.

As shown in FIG. 15, positioning of the plant/lug in relation to the belt 56 can be varied by adjusting plant stop bolts 73 on the plant eject frame 47. This may be necessary due to differing plug consistencies, moisture etc. The adjuster bolts hit against the roller frame uprights 13 and stop the forward movement of the frame 47.

Figure 15A:
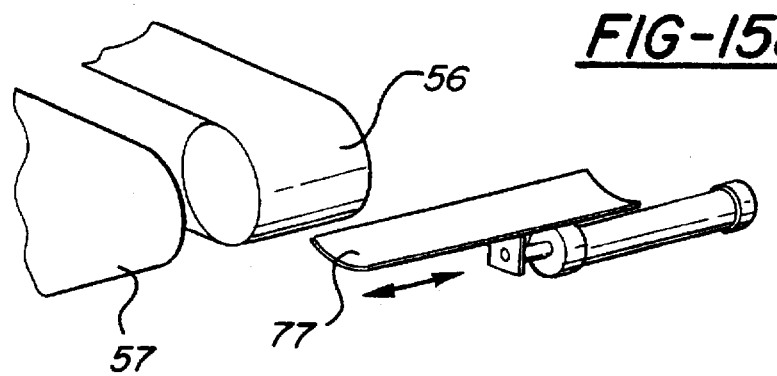
FIGS. 15a and 15b illustrate apparatus for handling plants as they leave the retainer belt conveyor shown in FIGS. 12a to 12g.
Figure 15B:
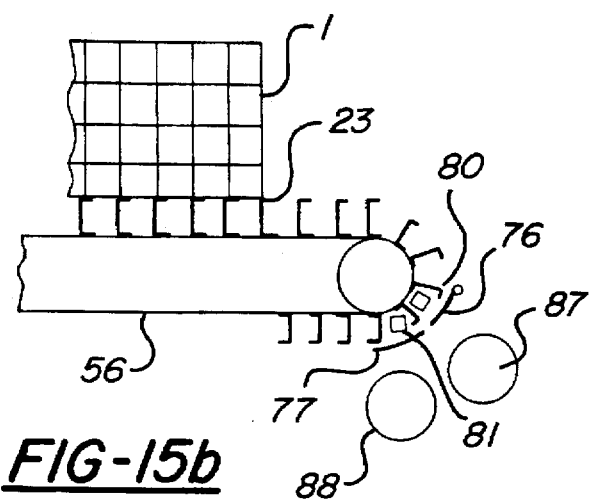

When the plant transfer assembly 56 has two plants remaining prior to reaching a point of having vacancies in all plant containers adjacent to the tray 1, software provides for two receiver stations, one being in a rotationally hinged door 76 and the other a linear activated pocket 77. These receiving stations (operated pneumatically) are both closed and the conveyor drive is indexed twice rapidly placing plants in both of these receiving stations 76, 77. This enables, on receipt of the encoder pulse which is measuring precisely the distance travelled, the planting of two plants 80, 81 while the mechanism is being repositioned mechanically. This plant storage system allows the maintenance of high speed transplanting with no gaps allowing for two plants to be planted while trays are indexed. The software is programmed so that when the second stored plant 81 is used (FIG. 15a), the conveyor belt 56, 57 begins to move at 8.25 plants per second.

A foam rubber roller is mounted on an axle (free rotating). This roller is preferably the same transverse width as the plug retainer and is positioned so as to stop any plugs/plants from falling out just before the plants enter storage doors hinged at a receiver station 76.

Figure 15E:
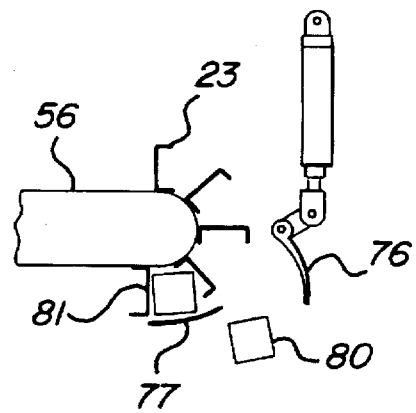
Figure 15F:
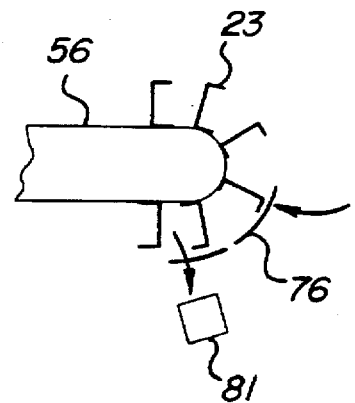
Figure 15G:
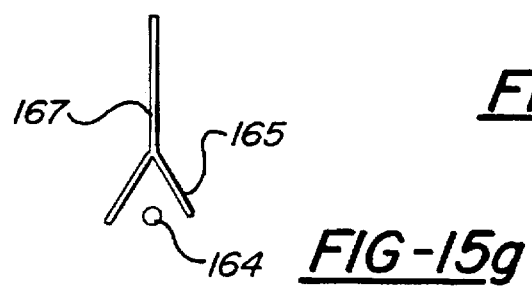
Figure 15C:
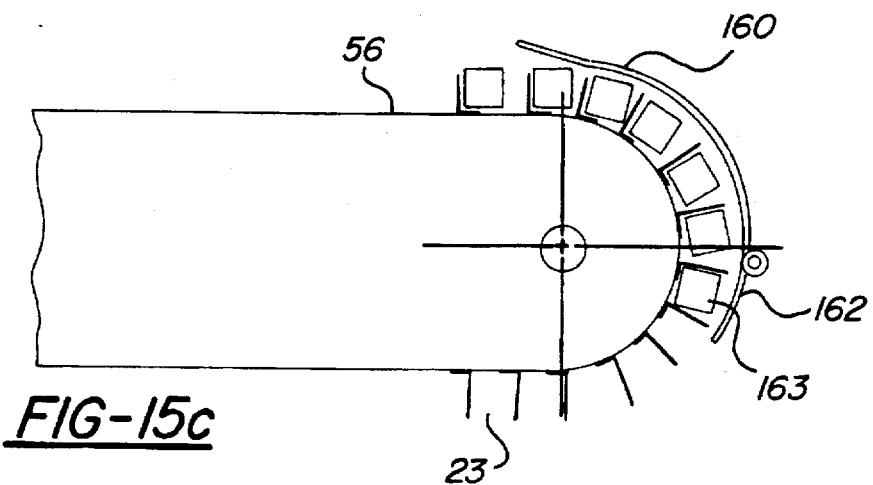
Figure 15D:
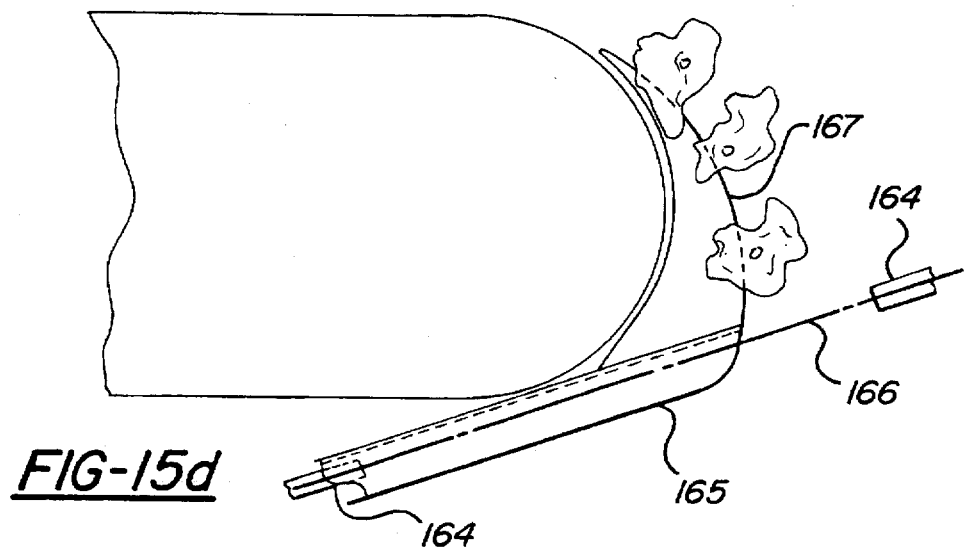

FIGS. 15c and 15e show alternative handling means as plants are transferred from the retainer conveyor 56 to the transfer mechanism 85. In FIG. 15c the plants may be contained between a curved piece of sheet steel 160 and the belt 56. This ensures that the plants cannot fall out prematurely. At the end of this chute there is a hinged extension 162. Immediately prior to the ejection step the conveyor 56 racks twice as fast and the hinge door swings down storing a plant in a drop position 163. Whilst under normal conveyor movement the hinged door 162 is up allowing plants to drop off unhindered at the door position 163. Mid sequence of the conveyor movement and ejection process, the door 162 snaps open allowing the plant access to the transfer conveyor 85. This compensates for the slowing of the machine keeping even planting in the field.

A fibre optic sensor 164 (FIG. 15d) ensures that the machine is fully selective. It senses the presence of a plant. If a plant is not present then the conveyor 56 indexes extremely fast until a plant is sensed then allows planting to continue. To eliminate any false signals created by soil or particles falling off the conveyor and triggering the sensors, a cover 165 has been placed over the beam 166. At the end of this cover and immediately on top of it a curved piece of sheet steel 167 is positioned against the belt 56 which allows any soil or particles to fall down and not be defected, but the stem and foliage of the plant is guided out and down over the guide 167 and ensures correct object for scanning and sensing.

In an alternative possible arrangement, a gap 82 (FIG. 16) may be left between the belts 56 and 57. At a convenient position on the horizontal plane of the belt, a scanning device 83 is mounted so as to read reflected light from the lower plant stems 84 just above the plug which is generally free from foliage. This device is mounted vertically to be able to read wall to wall of the plug retaining cell (on the belt 56) and to determine the presence or absence of a plant. The software is programmed with a shift register so as to advance until a live plant is held ready at the planting position. This ensures that the machine is selective and therefore, part planting gapping up by hand is not required. With a belt transfer speed of 8.25 cells per second means that four cells without a plant can be tolerated and still achieve a planting rate of two plants per second per row delivered into the ground without gaps.

After a plant leaves the conveyor 56 from the chute 77, it enters the transfer conveyor 85 (FIG. 17). This conveyor 85 takes the plant and conveys it down and reorientates same through 90° to position it at a planting mechanism including planting discs 86 ready for the final stage of planting. The conveyor 85 is driven via sprockets and chains direct from the land wheels which engage on the ground and drive the machine. It is timed to ground speed as are the planting discs 86.

The plant is placed into the gap at the head of the two pulleys 87, 88 (pulley 87 travelling anti-clockwise and pulley 88 travelling clockwise). The plant is then held by the belts 89 and transferred down the conveyor where it is released at the lower pulleys 90, 91. At this point, prior to being released, it is held between the planting discs 86 and transferred into a ground planting position. Rollers 92 ensure that the belts remain together (keeping constant pressure on the plug) stopping any movement of the plug in the belts. This works similar to a swallowing action.

At the point where the transfer conveyor 85 meets the planting discs 86 there is a mechanism which alters the distance between the planting discs 86 and the transfer conveyor 85. This adjustment is required when deeper planting is required as it holds the root mass further away from the planting discs 86 therefore transplanting the plants deeper into the ground. This mechanism comprises a handle 93 and threaded shaft 94 which screws into a pipe 95 which is welded to a cross bar 96 which in turn slides into two pivot tubes 97 and 98 which are connected to the arms of the transfer conveyor 85. Thus, turning the handle either way pulls the transfer conveyor away from the discs 86, or pushes it toward the discs 86. The pivoting tubes 97, 98 are spring compensated, so that when a plant goes through the lower rollers 90, 91, it forces the rollers apart but pressure is still constantly applied to the plug via the springs keeping the plug gripped.

From the transfer mechanism 85, the plant is transferred to the planting discs 86 (FIG. 19). These two discs 86 are angled to each other and open at the bottom 99 which allows the plant to be placed in the soil in a planting position prepared by a furrow device. The discs 86 remain open along the periphery 100 until they approach the transfer mechanism 85 at which time they close together at 101 to hold the plant stem and foliage 102. The discs 86 then remain closed together until the plant is released at the bottom 99. The planting discs 86 are again driven via a chain and sprocket from the driving wheels. The chain drive passes from the drive wheel and primary shaft then from the primary shaft back to the planting discs. The circumferential speed of the discs and the linear speed of the belts are the same as the ground speed so the plants and plug are placed at ground speed. Thus, the periphery of the discs 86 is stationary relative to the ground and the plant is stationary relative to the ground at time of planting which maintains vertical positioning of the plant and accuracy of placement.

On the outside of each disc 86 are rollers 103 which are spring mounted so they keep constant pressure on the discs in the area between where the plant is taken from the transfer conveyor 85 to where it leaves the discs and is planted into the ground. It also maintains centrality of planting discs due to stops on sides of the springs. When a plant enters the disc and proceeds down and is carried by the discs 86, the discs 86 can move out against the springs to allow for the plant, but still keeping pressure on the plant. This stops. any damage to the plant and keeps the plant central.

The discs 86 are deflected at the axis so that from the point 104 to 106 they are in contact and from the point 106 in the anti-clockwise direction they are diverging apart. This means that the plant is released at the point 106. The plug 107 that is held between the discs 86 with the plug held externally move around through the split shoe or furrow forming device 108 which is parting the soil, and depending on soil consistency, the shoe can be moved forward or back to ensure that the soil envelopes the exposed plug before being relaxed by the stainless discs 86. The packer wheels 109 are adjustable to ensure that the soil and root mass are packed down only after the planting discs are released the plant.

FIG. 22 illustrates schematically a complete assembly where the roller frame 10 is pivoted at 113 from the tool bar 111 of a tractor 112 to compensate for ground height variations. This results in the packaging wheels 109 always maintaining contact with the surface of the ground. Therefore, independently, controlling each of the planting heads accurately relative to the contour or surface of the ground and therefore maintaining a constant height from the outer circumference of the planting discs 86 to the surface of the ground. This height is adjusted by undoing bolts and raising or lowering the disc assembly 86.

I claim:

1. A field seedling planting machine movable in a planting direction along a field for transplanting seedlings propagated in a seedling tray to a prepared ground portion of said field, said tray having a plurality of individual cells the contents of each of which includes a propagating medium and desirably a seedling, said machine comprising eject means for ejecting the contents of each of said cells; first conveyor means for receiving the ejected contents and transporting them sequentially to an intermediate transfer region; first drive means coupled to said first conveyor means for driving the latter toward said intermediate transfer region; second conveyor means for receiving the ejected contents from said first conveyor means at said intermediate transfer region and transporting such contents sequentially to the prepared ground portion; second drive means coupled to said second conveyor means for driving the latter; sensor means adjacent said intermediate transfer region and upstream of said second conveyor means for sensing the presence or absence of seedlings in successive ones of said contents; and control means linked with said sensor means and said first drive means and responsive to the presence or absence of seedlings between adjacent ones of said contents on said first conveyor means to adjust the speed of said first drive means independently of said second drive means for delivering substantially equally spaced contents containing seedlings to said second conveyor means notwithstanding variations in the spacing between contents containing seedlings on said first conveyor means.

2. A field seedling planting means according to claim 1 including seedling holding means on said first conveyor means for holding the seedlings.

3. A field seedling planting means according to claim 2 wherein each said seedling holding means is adapted to hold one seedling.

4. A field seedling planting machine according to claim 1 wherein said second drive means moves said second conveyor means at such speed that seedlings are carried by said second conveyor means at a speed directly related to ground speed movement of the planting machine along said field.

5. A field seedling planting machine according to claim 2 or claim 3 wherein said first conveyor means is moved at a speed greater than the speed of movement of the seedlings carried by said second conveyor means between periods during which one or more said seedlings are positioned in the holding means or a seedling is transferred to said second conveyor means.

6. A field seedling planting machine according to claim 2 or claim 3 wherein said first conveyor means is moved at a speed greater than the speed of movement of the seedlings carried by said second conveyor means between periods during which one or more said seedlings positioned in the holding means are transferred to said second conveyor means.

7. A field seedling planting machine according to claim 1 characterized in that said first conveyor means is moved by said first drive means incrementally by a distance equivalent to one cell in the tray.

8. A field seedling planting machine according to claim 7 wherein said first conveyor drive means comprises at least one sprocket wheel having drive pegs engagable with openings in the first conveyor means.

9. A field seedling planting machine according to claim 7 wherein said first conveyor means comprises a primary belt conveyor and a secondary belt conveyor alongside said primary belt conveyor.

10. A field seedling planting machine according to claim 1 including at least one seedling holder at said transfer region, said holder being operable to deliver a seedling to said second conveyor means, said seedling holder being arranged to hold a seedling by moving said first conveyor means at a speed greater than that of said second conveyor means prior to stopping said first conveyor means to eject one or more additional cell contents from said tray to said first conveyor means, said contents of each cell delivered to said second conveyor means being at such rate as to maintain substantially equal spacing of seedlings carried by said second conveyor means.

11. A field seedling planting machine according to claim 10 wherein each said holder includes closure means adapted to retain a seedling therein, said closure means being closed during a least initial stages of movement of said first conveyor means, and means for subsequently opening said closure means.

12. A field seedling planting machine according to claim 10 wherein a plurality of said holders are provided, each said holder including closure means adapted to retain a seedling therein, said closure means being closed during at least initial stages of movement of said first conveyor means, and means for thereafter opening said holders for sequentially delivering seedlings from said holders to said second conveyor means.

13. A field seedling planting machine movable in a planting direction along a field for transplanting seedlings propagated in a seedling tray to a prepared ground portion of said field, said tray having a plurality of cells the contents of each of which includes a propagating medium and desirably a seedling, said machinery comprising eject means for ejecting the contents of each of said cells; first conveyor means for receiving the contents of each cell and conveying said contents toward the prepared ground portion; first seedling holding means carried by said first conveyor means; an intermediate transfer station; first drive means for moving said first conveyor means to deliver said contents sequentially to said intermediate transfer region; second conveyor means disposed to receive said seedlings from said first conveyor means at said intermediate transfer station and to deliver said seedlings to the prepared ground planting portion; second drive means for moving said second conveyor means; seedling retaining means at said intermediate transfer region operable to deliver a seedling to said second conveyor means; sensor means located adjacent said intermediate transfer region and being operable to determine if a seedling is held in said seedling retaining means, said seedling retaining means being operable to hold a seedling by moving said first conveyor means independently of said second conveyor means at a speed greater than that of said second conveyor means prior to stopping said first conveyor means to eject the contents of a tray cell from said tray to the holding means of said first conveyor means, said seedling in each said retaining means being delivered to said second conveyor means at a rate to maintain substantially equal spacing of seedlings carried by said second conveyor means.

14. A field seedling planting machine according to claim 13 wherein each said retaining means includes closure means adapted to retain a seedling therein, said closure means being closed during at least initial stages of movement of said first conveyor means, and means for subsequently opening said retaining means.

15. A field seedling planting machine according to claim 1 or claim 13 wherein the first conveyor means includes at least one conveyor belt with a plurality of spaced upright partition means disposed transversely relative to said belt and defining contents-receiving zones forming said holding means, each said receiving zone having an overlying stop means at least partially spanning the space between adjacent partition means whereby a seedling located in any said receiving zone is prevented from moving upwardly out of said receiving zone.

16. A field seedling planting machine according to claim 15 wherein said stop means comprises a projection extending from each partition means at least part way across the space between adjacent said partition means.

17. A field seedling planting machine according to claim 15 including support means adjacent said eject means for holding said tray, indexing means for moving said tray downwardly in said support means relative to said eject means whereby successive cells of said tray are brought into alignment with said eject means, and lift means for lifting said seedling tray upwardly relative to the first conveyor means after each operation of said eject means.

18. A field seedling planting machine according to claim 17 wherein said support means and said tray are lifted by said lift means.

19. A field seedling planting machine according to claim 17 wherein said support means includes upright partition walls positioned to divide foliage of the seedlings in adjacent cells.

20. A field seedling planting machine according to claim 19 including guide means for guiding stems of the seedlings in a tray into respective receiving zones of the first conveyor means as said tray is moved downwardly.

21. A field seedling planting machine according to claim 17 wherein said indexing means includes a plurality of evenly spaced formations in opposed walls of said seedling trays, said formations being engaged by toothed actuation means to index said tray and accurately align said cells with the eject means.

22. A field seedling planting machine according to claim 15 wherein said eject means comprises a plurality of adjacent curved tines adapted to be moved through a curved path to engage base regions of contents of a cell and thereafter push said contents into a receiving zone of the first conveyor means.

23. A field seedling planting machine according to claim 22 wherein each said curved tine has a relative wide tip portion and a relative narrow shank portion.

24. A field seedling planting machine according to claim 1 or claim 13 wherein said second conveyor means includes a pair of endless belt conveyors arranged with a belt run of each belt conveyor adjacent one another, said belt runs being disposed to receive and hold successive ones of said seedlings therebetween while moving said seedlings from an inlet end to a discharge end of said belt runs, said belt runs further angularly reorienting said seedlings during movement from said inlet end to said discharge end.

25. A field seedling planting machine according to claim 24 wherein said seedlings are aligned with the planting direction at the discharge end of said belt runs.

26. A field seedling planting machine according to claim 24 wherein seedlings in said cells of said trays are disposed at 90° to said planting direction.

27. A field seedling planting machine according to claim 24 wherein each said endless belt conveyor is formed by a plurality of V-belts.

28. A field seedling planting machine according to claim 19 wherein said second conveyor means includes a pair of adjacent rotatable discs located to receive and hold foliage ends of successive seedlings between said discs with the propagating medium free of peripheral edge zones of said discs, said discs being disposed generally in the planting direction and being operable to release said seedlings therefrom to deposit said propagating medium in said prepared ground planting position.

29. A field seedling planting machine according to claim 28 including means to move the discharge end of said belt runs relative to the peripheral edge zones of said discs thereby varying the planting depth of said propagating medium.

* * * * *

UNITED STATES PATENT AND TRADEMARK OFFICE
CERTIFICATE OF CORRECTION

PATENT NO. : 5,676,072
DATED : October 14, 1997
INVENTOR(S) : Geoffrey Alan Williames It is certified that error appears in the above-identified patent and that said Letters Patent is hereby corrected as shown below:

Column 4, line 42, cancel "longitudinal section".

Column 5, line 10, cancel "and"; line 16, change "18" to -- 18a --.

Column 6, line 34, change "tp" to -- to --.

Column 14, line 43, change "19" to -- 15 --.

Signed and Sealed this

Fourteenth Day of April, 1998

*Attest:*

BRUCE LEHMAN

*Attesting Officer*     *Commissioner of Patents and Trademarks*